US012634736B2

(12) United States Patent
Duan et al.

(10) Patent No.: US 12,634,736 B2
(45) Date of Patent: May 19, 2026

(54) NETWORK-ASSISTED WINDOWING FOR WIRELESS SENSING

(71) Applicant: QUALCOMM Incorporated, San Diego, CA (US)

(72) Inventors: Weimin Duan, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 18/163,826

(22) Filed: Feb. 2, 2023

(65) Prior Publication Data

US 2024/0276263 A1 Aug. 15, 2024

(51) Int. Cl.
*H04W 24/10* (2009.01)
*H04W 72/0453* (2023.01)

(52) U.S. Cl.
CPC ....... *H04W 24/10* (2013.01); *H04W 72/0453* (2013.01)

(58) Field of Classification Search
CPC ............. H04W 24/10; H04W 72/0453; H04W 24/08; H04W 72/0457; H04W 72/231; H04W 72/232; G01S 13/765; G01S 13/876; G01S 7/006; G01S 7/0236; G01S 13/003; G01S 13/10; G01S 7/0235; H04B 7/06952; H04L 5/0051; H04L 27/2605
See application file for complete search history.

(56) References Cited

U.S. PATENT DOCUMENTS

| | | | | |
|---|---|---|---|---|
| 11,576,188 B2 * | 2/2023 | Amer | ................... | H04W 24/08 |
| 11,796,669 B2 * | 10/2023 | Lee | ................... | H04B 7/0682 |
| 2022/0104111 A1 | 3/2022 | Zorgui et al. | | |
| 2022/0201694 A1 * | 6/2022 | Amer | ................... | H04W 24/08 |
| 2022/0236394 A1 | 7/2022 | Nam et al. | | |
| 2022/0400462 A1 | 12/2022 | Dai et al. | | |
| 2023/0262493 A1 * | 8/2023 | Ren | ................... | H04L 5/0048 |
| | | | | 370/252 |
| 2023/0300868 A1 * | 9/2023 | Ma | ................... | H04B 17/345 |
| | | | | 370/252 |
| 2023/0358854 A1 * | 11/2023 | Yao | ................... | G01S 7/41 |
| 2025/0081020 A1 * | 3/2025 | Li | ................... | H04W 4/38 |

(Continued)

OTHER PUBLICATIONS

International Search Report and Written Opinion—PCT/US2023/082518—ISA/EPO—Mar. 11, 2024.

*Primary Examiner* — Brian T O Connor
(74) *Attorney, Agent, or Firm* — QUALCOMM Incorporated

(57) ABSTRACT

A sensing node may receive a set of sensing signals. The sensing node may calculate a first joint spectrum based on a first windowing function and the set of sensing signals. The sensing node may calculate a second joint spectrum based on a second windowing function and the set of sensing signals, wherein the first windowing function is different than the second windowing function. The sensing node may transmit a first joint spectrum report based on the first joint spectrum and a second joint spectrum report based on the second joint spectrum to a sensing entity. The sensing node may estimate a parameter of a target object based on an optimal spectrum ID received from the sensing entity, where the optimal spectrum ID may be associated with at least one of the first joint spectrum or the second joint spectrum.

27 Claims, 14 Drawing Sheets

800

(56)　　　　　　References Cited

U.S. PATENT DOCUMENTS

| | | | | |
|---|---|---|---|---|
| 2025/0097754 A1* | 3/2025 | Li | ......................... | H04W 64/00 |
| 2025/0141630 A1* | 5/2025 | Zhang | ................... | H04L 5/0051 |
| 2025/0184013 A1* | 6/2025 | Li | ........................ | H04B 17/309 |

\* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

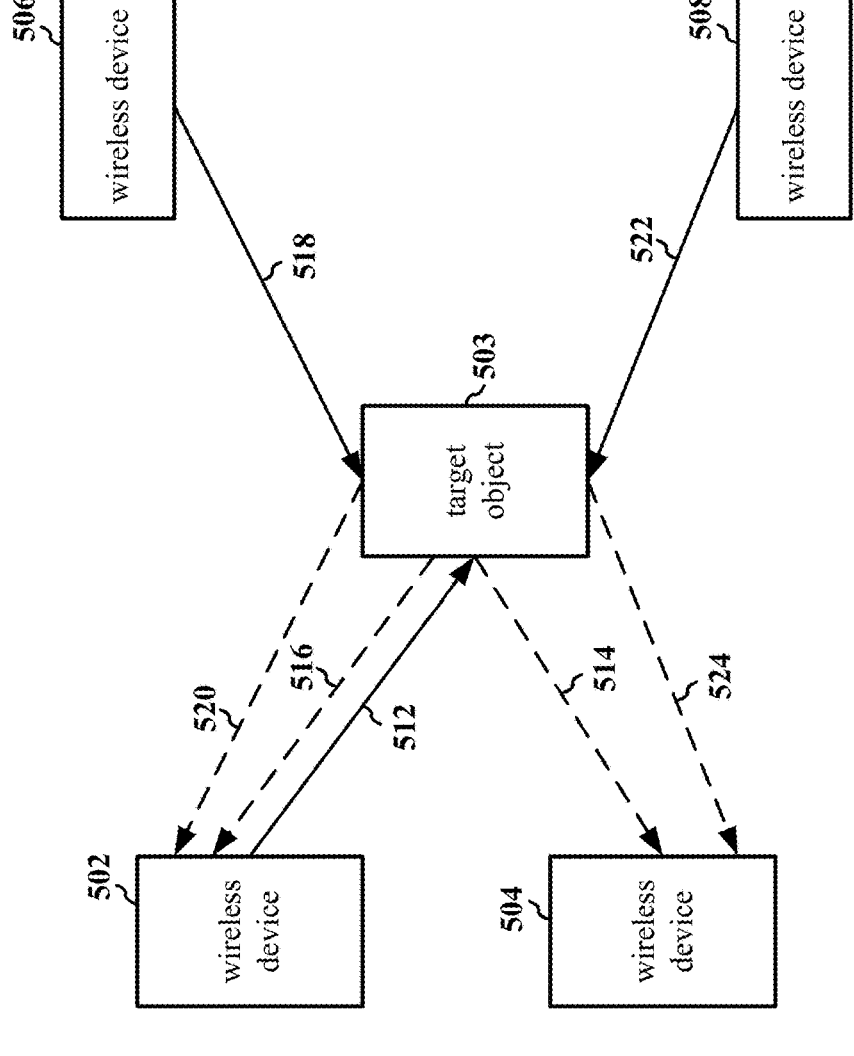
FIG. 5

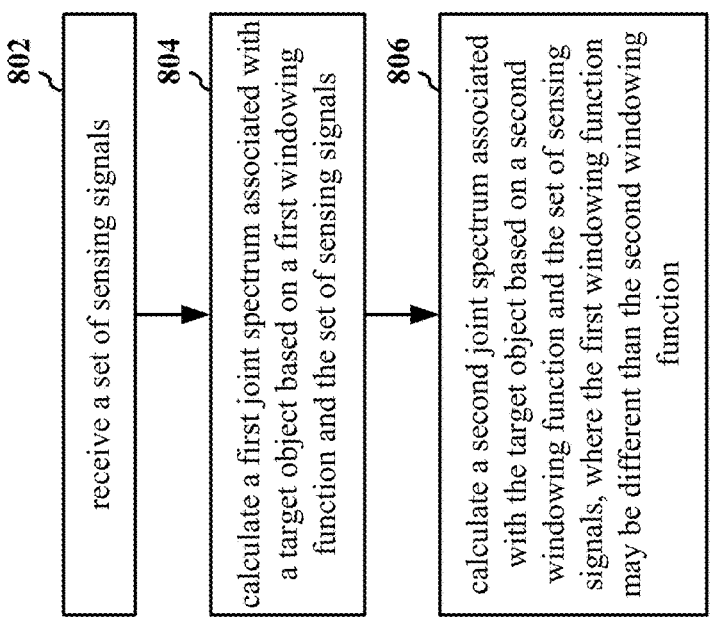

802 — receive a set of sensing signals

804 — calculate a first joint spectrum associated with a target object based on a first windowing function and the set of sensing signals 806 — calculate a second joint spectrum associated with the target object based on a second windowing function and the set of sensing signals, where the first windowing function may be different than the second windowing function

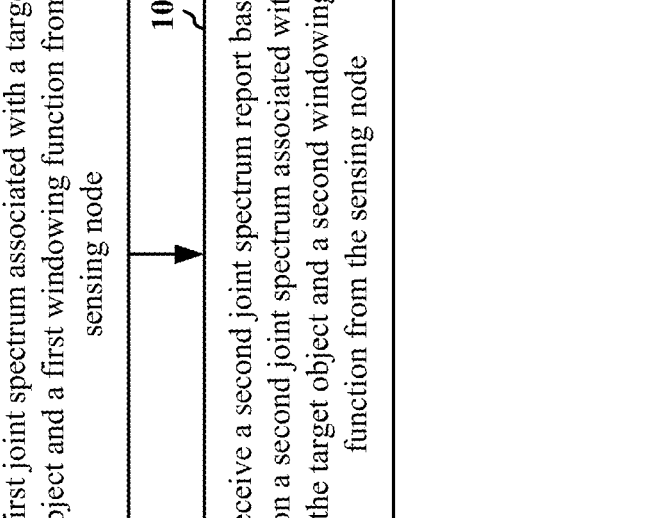
1002 receive a first joint spectrum report based on a first joint spectrum associated with a target object and a first windowing function from a sensing node
1004 receive a second joint spectrum report based on a second joint spectrum associated with the target object and a second windowing function from the sensing node
1000
FIG. 10

NETWORK-ASSISTED WINDOWING FOR WIRELESS SENSING

TECHNICAL FIELD

The present disclosure relates generally to communication systems, and more particularly, to a system for sensing target objects using radio frequency (RF) sensing signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a sensing device or a sensing node. The apparatus may receive a set of sensing signals. The apparatus may calculate a first joint spectrum based on a first windowing function and the set of sensing signals. The apparatus may calculate a second joint spectrum based on a second windowing function and the set of sensing signals. The first windowing function may be different than the second windowing function.

In an aspect of the disclosure, a method, a computer-readable medium, and an apparatus are provided. The apparatus may include a sensing entity. The apparatus may receive a first joint spectrum report based on a first joint spectrum from a sensing node. The apparatus may receive a second joint spectrum report based on a second joint spectrum from the sensing node.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of sensing based on sensing signal measurements.

FIG. 8 is a flowchart of a method of wireless communication.

FIG. 10 is a flowchart of a method of wireless communication.

DETAILED DESCRIPTION

Figure 1:
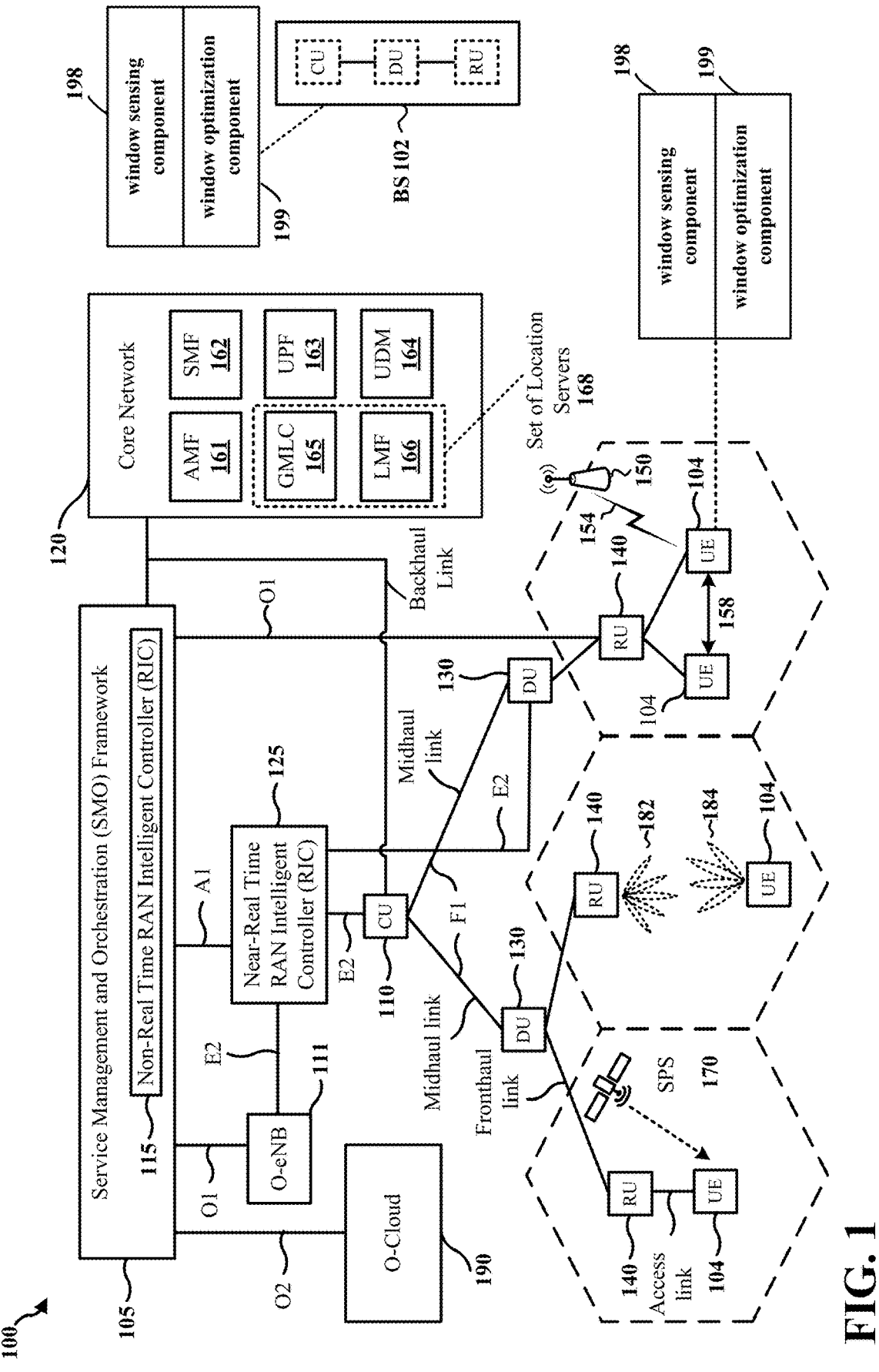
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 or the UE 104 may have a window sensing component 198 that may be configured to receive a set of sensing signals. The window sensing component 198 may be configured to calculate a first joint spectrum associated with a target object based on a first windowing function and the set of sensing signals. The window sensing component 198 may be configured to calculate a second joint spectrum associated with the target object based on a second windowing function and the set of sensing signals. The first windowing function may be different than the second windowing function. In certain aspects, the base station 102 or the UE 104 may have a window optimization component 199 that may be configured to receive a first joint spectrum report based on a first joint spectrum associated with a target object and a first windowing function from a sensing node. The window optimization component 199 may be configured to receive a second joint spectrum report based on a second joint spectrum associated with the target object and a second windowing function from the sensing node. A sensing system using wireless devices, such as the base station 102 or the UE 104, utilizing the window sensing component 198 and the window optimization component 199 may improve the target detection and parameter estimation of sensing signals by exploiting windowing functions that reduce noise, interference, and other artifacts from measured sensing spectrum.

Figures 2A, 2B, 2C, 2D:
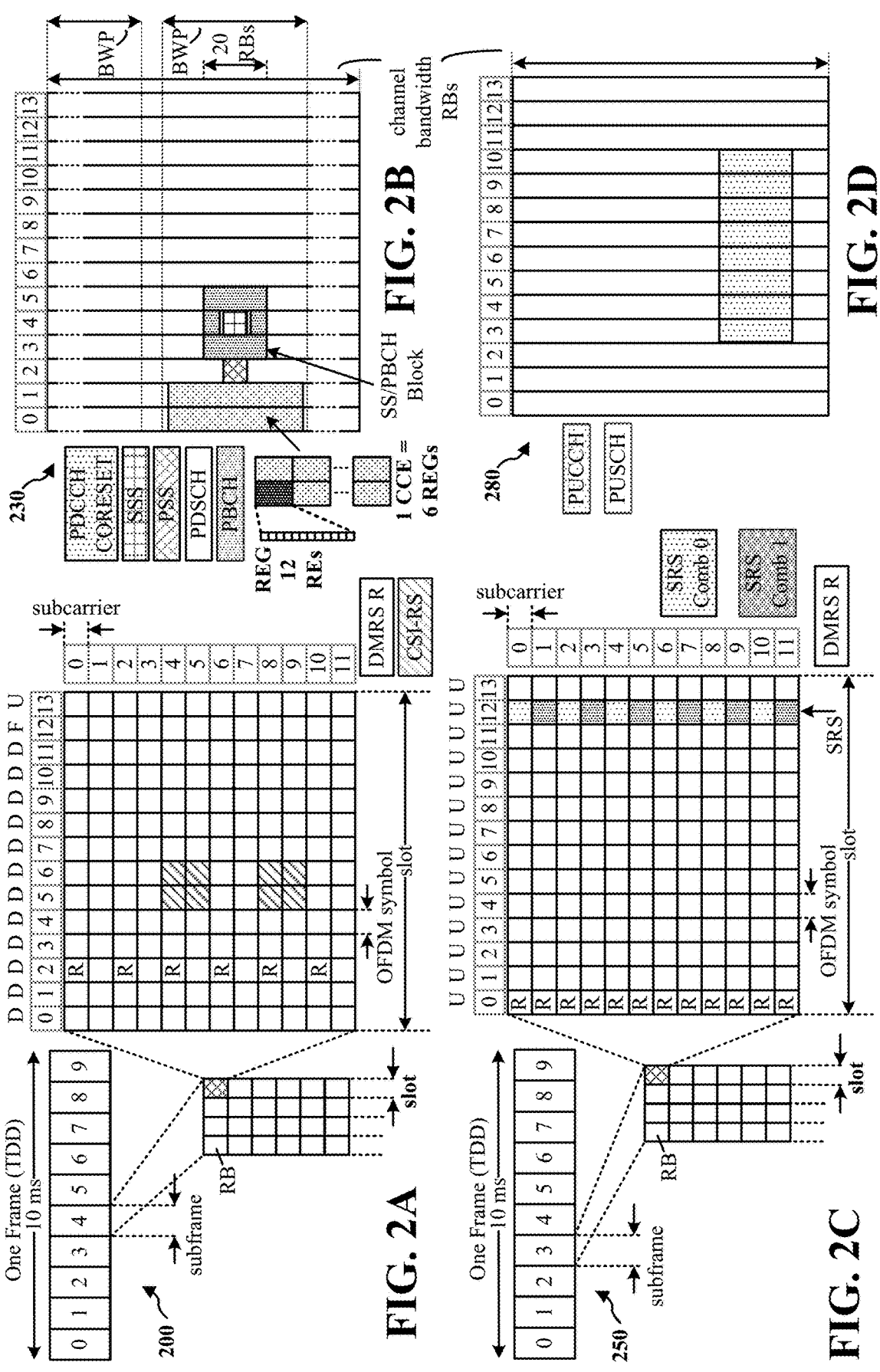
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^{\mu*15}$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
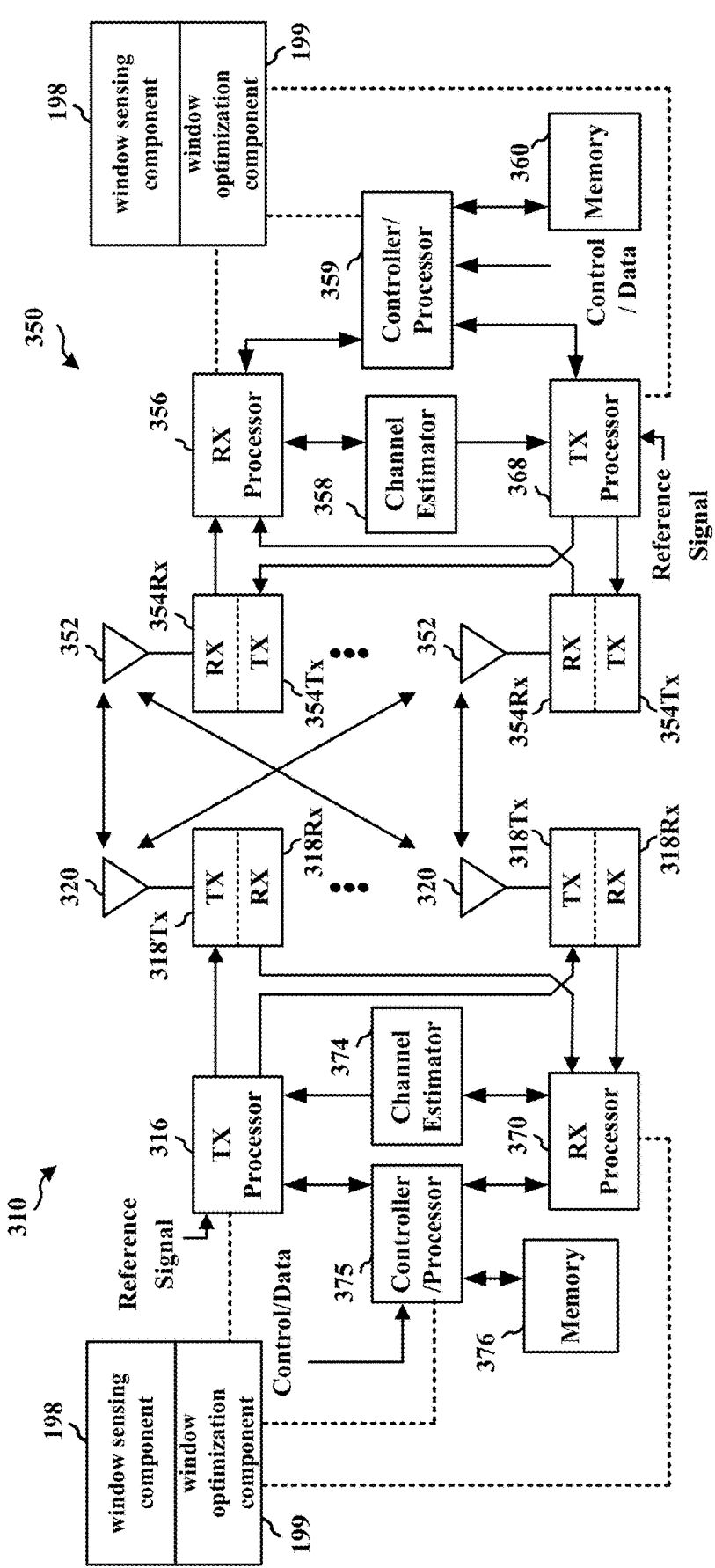
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the window sensing component 198 of FIG. 1.

At least one of the TX processor 368, the RX processor 356, and the controller/processor 359 may be configured to perform aspects in connection with the window optimization component 199 of FIG. 1.

At least one of the TX processor 316, the RX processor 370, and the controller/processor 375 may be configured to perform aspects in connection with the window sensing component 198 of FIG. 1.

At least one of the TX processor 316, the RX processor 370, and the controller/processor 375 may be configured to perform aspects in connection with the window optimization component 199 of FIG. 1.

Figure 4:
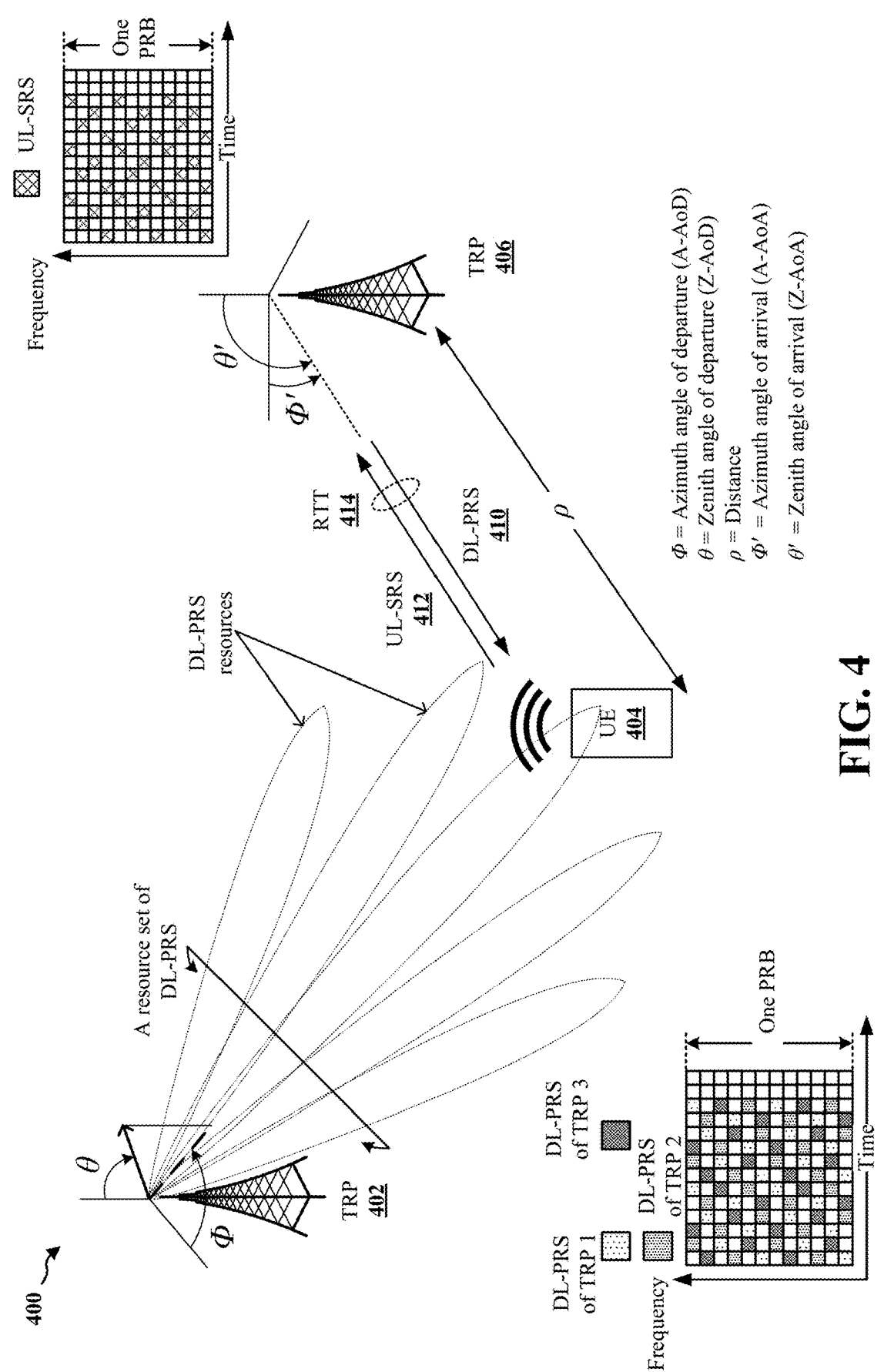
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_Rx}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $\|T_{SRS\_RX}-T_{PRS\_TX}\|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

FIG. 5 is a diagram 500 illustrating an example of sensing based on measuring sensing signals transmitted by one or more sensing signals that reflect off of a target object 503. A wireless device that transmits a sensing signal that reflects off of a target object may be referred to as a transmitter node. A wireless device that receives a reflected sensing signal and measures the reflected sensing signal to perform sensing may be referred to as a receiver node. In one aspect, the wireless device 502 may perform monostatic sensing. The wireless device 502 may act as both a transmitter node and a receiver node. The wireless device 502 may transmit a set of sensing signals 512 at the target object 503, the target object 503 may reflect the set of sensing signals 512 as the reflected set of sensing signals 516 at the wireless device 502, and the wireless device 502 may measure the reflected set of sensing signals 516 from the target object 503. In another aspect, the wireless device 502 and the wireless device 504 may perform bistatic sensing. The wireless device 502 may act as a transmitter node and the wireless device 504 acts as a receiver node. The wireless device 502 may transmit a set of sensing signals 512 at the target object 503, the target object 503 may reflect the set of sensing signals 512 as the reflected set of sensing signals 514 at the wireless device 504, and the wireless device 504 may measure the reflected set of sensing signals 514 from the target object 503. In another aspect the wireless device 502 and the wireless device 506 may perform multi-static sensing. The wireless device 502 may act as both a transmitter node and a receiver node, for a first set of sensing signals, and the wireless device 506 acts as a transmitter node while the wireless device 502 acts as a receiver node for a second set of sensing signals. In addition to the wireless device 502 measuring the reflected set of sensing signals 516 from the target object 503 using monostatic sensing, the wireless device 506 may transmit a set of sensing signals 518 at the target object 503, the target object 503 may reflect the set of sensing signals 518 as the reflected set of sensing signals 520 at the wireless device 502, and the wireless device 502 may measure the reflected set of sensing signals 520 from the target object 503. In another aspect the wireless device 502, the wireless device 504, and the wireless device 508 may perform multi-static sensing. The wireless device 502 may act as a transmitter node and the wireless device 504 acts as a receiver node for a first set of sensing signals, and the wireless device 508 acts as a transmitter node and the wireless device 504 acts as a receiver node for a second set of sensing signals. In addition to the wireless device 504 measuring the reflected set of sensing signals 514 from the target object 503 using bistatic sensing, the wireless device 508 may transmit a set of sensing signals 522 at the target object 503, the target object 503 may reflect the set of sensing signals 522 as the reflected set of sensing signals 524 at the wireless device 504, and the wireless device 504 may measure the reflected set of sensing signals 524 from the target object 503. Each wireless device may be any wireless device configured to transmit or receive wireless signals, such as UEs, network nodes, TRPs, or base stations. For example, the wireless device 502 may be a network node configured to transmit the set of sensing signals 512 at the target object 503 and measure the reflected set of sensing signals 516 from the target object 503. In another example, the wireless device 502 may be a network node configured to transmit the set of sensing signals 512 at the target object 503, and the wireless device 504 may be a UE configured to measure the reflected set of sensing signals 514 from the target object 503.

The wireless device 502 may conduct one or more sensing measurements on the reflected set of sensing signals 516 and/or the reflected set of sensing signals 520. In one aspect, the wireless device 502 may calculate a distance or a range between the wireless device 502 and the target object 503 based on a round trip time (RTT) between when the wireless device 502 transmits the set of sensing signals 512 and when the wireless device 502 receives the reflected set of sensing signals 516. In one aspect, the wireless device 502 may calculate a distance or a range that the set of sensing signals 518 and the reflected set of sensing signals 520 travels based on a time between when the wireless device 506 transmits the set of sensing signals 518 and when the wireless device 502 receives the reflected set of sensing signals 520. In one aspect, the wireless device 502 may calculate a location of the target object 503 based on a plurality or range or distance measurements, for example via triangulation using known positions of the wireless devices 502 and 506 and the calculated range or distance measurements. In one aspect, the wireless device 502 may calculate a velocity of the target object 503 based on a first calculated location of the target object 503 based on the reflected set of sensing signals 516 and/or the reflected set of sensing signals 520 measured at a first time, and a second calculated location of the target object 503 based on the reflected set of sensing signals 516 and/or the reflected set of sensing signals 520 measured at a second time. In one aspect, the wireless device 502 may calculate an AoA of the reflected set of sensing signals 516 and/or an AoD of the set of sensing signals 512 based on a plurality of ports that transmitted the set of sensing signals 512 and a plurality of ports that received the reflected set of sensing signals 516. In one aspect, the wireless device 502 may calculate an AoA of the reflected set of sensing signals 520 and/or an AoD of the set of sensing signals 518 based on a plurality of ports that transmitted the set of sensing signals 518 and a plurality of ports that received the reflected set of sensing signals 520.

Similarly, the wireless device 504 may conduct one or more sensing measurements on the reflected set of sensing signals 514 and/or the reflected set of sensing signals 524. In one aspect, the wireless device 504 may calculate a distance or a range that the set of sensing signals 512 and the reflected set of sensing signals 514 travels based on a time between when the wireless device 502 transmits the set of sensing signals 512 and when the wireless device 504 receives the reflected set of sensing signals 514. In one aspect, the wireless device 504 may calculate a distance or a range that the set of sensing signals 522 and the reflected set of sensing signals 524 travels based on a time between when the wireless device 508 transmits the set of sensing signals 522 and when the wireless device 504 receives the reflected set of sensing signals 524. In one aspect, the wireless device 504 may calculate a location of the target object 503 based on a plurality or range or distance measurements, for example via triangulation using the known positions of wireless devices 502, 504, and 508, and the calculated range or distance measurements. In one aspect, the wireless device 504 may calculate a velocity of the target object 503 based on a first calculated location of the target object 503 based on the reflected set of sensing signals 514 and/or the reflected set of sensing signals 524 measured at a first time, and a second calculated location of the target object 503 based on the reflected set of sensing signals 514 and/or the reflected set of sensing signals 524 measured at a second time. In one aspect, the wireless device 504 may calculate an AoA of the reflected set of sensing signals 514 and/or an AoD of the set of sensing signals 512 based on a plurality of ports that transmitted the set of sensing signals 512 and a plurality of ports that received the reflected set of sensing signals 514. In one aspect, the wireless device 504 may calculate an AoA of the reflected set of sensing signals 524 and/or an AoD of the set of sensing signals 522 based on a plurality of ports that transmitted the set of sensing signals 522 and a plurality of ports that received the reflected set of sensing signals 524.

While a wireless device may sense parameters of the target object 503 by measuring a reflected set of sensing signals originating from a transmitter node, such a wireless device may improve its sensing by measuring two or more reflected sets of sensing signals originating from two or more transmitter nodes. For example, the wireless device 502 may improve its sensing by measuring the reflected set of sensing signals 516 originating from the wireless device 502 as the set of sensing signals 512 in addition to measuring the reflected set of sensing signals 520 originating from the wireless device 506 as the set of sensing signals 518. In another example, the wireless device 504 may improve its sensing by measuring the reflected set of sensing signals 514 originating from the wireless device 502 as the set of sensing signals 512 in addition to measuring the reflected set of sensing signals 524 originating from the wireless device 508 as the set of sensing signals 522.

A sensing entity 530 may coordinate one or more of the wireless devices 502, 504, 506, and/or 508 to perform sensing on the target object 503, or an area about the target object 503. The sensing entity 530 may be a base station, or a network node of a core network, such as an LMF. The sensing entity may be configured to receive sensing requests from one or more wireless devices, such as a network node or a UE, and may select one or more wireless devices to perform sensing on an area about the target object 503 to sense and measure attributes of the target object 503. In some aspects, the sensing entity 530 may instruct a receiver node to measure sets of sensing signals and perform sensing to estimate attributes of the target object 503, such as the velocity of the target object 503 or a position of the target object 503, and transmit a sensing report including the estimated attributes to the sensing entity. In some aspects, the sensing entity 530 may instruct a receiver node to perform measurements on a set of sensing signals, and transmit a sensing report including the measurements to the sensing entity. The sensing entity 530 may perform sensing on the measurements to estimate attributes of the target object 503. In some aspects, the sensing entity 530 may collect a set of sensing reports from a plurality of receiver nodes, and may perform sensing on the set of sensing reports-merging data from a plurality of receiver nodes to increase the reliability of an estimate.

Figures 6A, 6B:
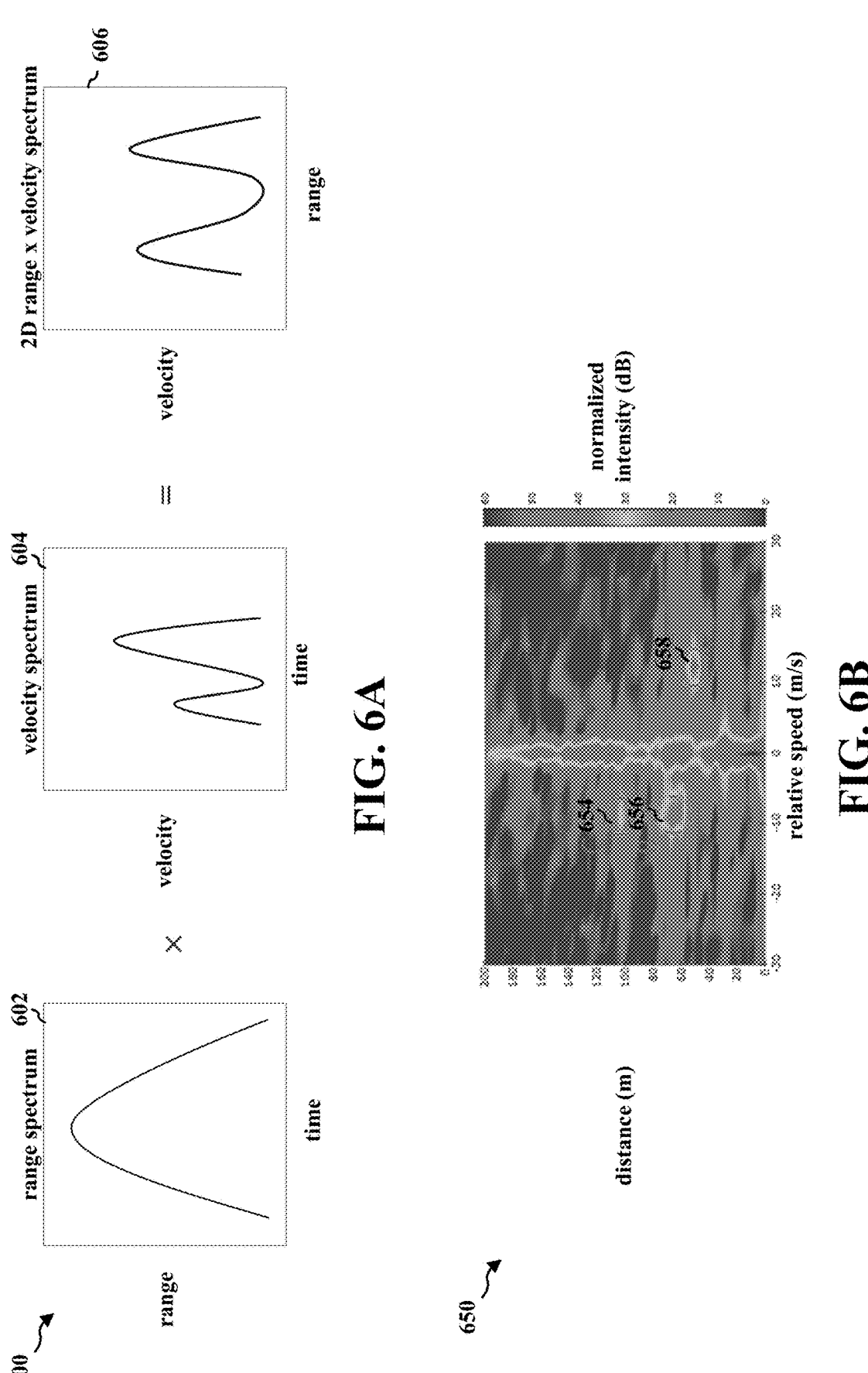
FIG. 6A is a diagram illustrating examples of sensing spectrums.
FIG. 6B is a diagram illustrating an example of a 2-D sensing spectrum having a windowing function applied to the 2-D sensing spectrum.

FIG. 6A is a diagram 600 illustrating examples of sensing spectrums. Diagram 602 shows a one-dimensional (1-D) range sensing spectrum based on a received set of sensing signals. Diagram 604 shows a 1-D velocity sensing spectrum based on a received set of sensing signals. Diagram 606 shows a two-dimensional (2-D) range×velocity spectrum based on the diagram 602 of a 1-D range sensing spectrum and the diagram 604 of a 1-D velocity spectrum.

In one example windowing function, a channel may receive two signals via two paths, one a direct path reflected off of a target object to the antenna, and another an indirect path reflected off of a target object and off of another object (e.g., a reflective surface, or a reconfigurable intelligent surface (RIS) device) to the antenna. The channel response may be estimated as:

$$h(t) = \delta(t - \tau_0) + a_1 \delta(t - \tau_1)$$

$\delta$ may represent the signal reflected off of the target object.

$a_1$ may represent a change to the signal when reflected off of the other object. In other words, $a_1$ may represent the difference (relative value) between the target's echo signal and the other reflected signal in magnitude.

t may represent a time when the channel is measured.

$\tau_0$ may represent a time when the signal reflected off of the target object $\tau_1$ may represent a time when the signal reflected off of the other object.

The frequency domain response of the channel may be estimated as:

$$H(\omega) = e^{-j\omega\tau_0} + a_1 e^{-j\omega\tau_1}$$

j may be a complex value symbol, such as the sqrt(−1).

$\theta$ may represent the angular frequency $2 \times \pi \times f$ of the channel.

A windowing function $W(\omega)$ may be used to maximize the amplitude of the main peak at the receiver device at $\tau_0$. For example, solving $\tau_0$: $\int W(\omega)H(\omega)e^{j\omega\tau_0}d\omega$ may have an energy constraint represented by $\int |W(\omega)|^2 d\omega = 1$ and a bandwidth constraint (by limiting the total out-of-band energy) may be represented by $$\int 1_{|\omega| > \omega_B} |W(\omega)|^2 d\omega \le \varepsilon.$$

Assuming $\int 1_{|\omega| > \omega_B} |W(\omega)|^2 d\omega = \varepsilon$ may result in a Lagrange. The Lagrange may be estimated as:

$$L = \int W(\omega)H(\omega)e^{j\omega\tau_0}d\omega + \mu \int |W(\omega)|^2 d\omega + \mu' \int 1_{|\omega| > \omega_B} |W(\omega)|^2 d\omega$$

$\mu$ may represent a Lagrange multiplier.

$\omega_B$ may represent a bandwidth (BW) of the signal. For example, $|\omega| > \omega_B$ may represent a signal that is out of bandwidth.

Solving using variational calculus may result in:

$$\frac{dL}{dW(\omega)} = \int H(\omega)e^{j\omega\tau_0}d\omega + \mu \int W^*(\omega)d\omega + \mu' \int 1_{|\omega| > \omega_B} W^*(\omega)d\omega = 0$$

This means that $H(\omega)e^{j\omega\tau_0} + \mu W^*(\omega) + \mu' 1_{|\omega| > \omega_B} W^*(\omega) = 0$.

When $|\omega| \le \omega_B$, $H(\omega)e^{j\omega\tau_0} + \mu W^*(\omega) = 0 \rightarrow W(\omega) = H^*(\omega)e^{-j\omega\tau_0}/\mu$.

When $|\omega| > \omega_B$, $$H(\omega)e^{j\omega\tau_0} + \mu W^*(\omega) + \mu' W^*(\omega) = 0 \rightarrow W(\omega) = H^*(\omega)e^{-j\omega\tau_0}/(\mu + \mu').$$

A modified matched filter may be calculated based on an in-band matched-filter and an out-of-band, attenuated matched filter.

An optimal filter may be calculated based on a multi-path profile. For example, the optimal filter may be anti-casual.

In some aspects, a window may be applied to multiple antennas. The channel response for multiple antennas may be represented by:

$$h_{n_t,n_r} = \delta\left(t - \tau_0 - \frac{n_t d_t \sin(\theta_{t,0}) + n_r d_r \sin(\theta_{r,0})}{\lambda}\right) + $$
$$a_1 \delta\left(t - \tau_1 - \frac{n_t d_t \sin(\theta_{t,1}) + n_r d_r \sin(\theta_{r,1})}{\lambda}\right)$$

$n_t$ may represent an antenna t.

$n_r$ may represent an antenna r.

$d_t$ may represent a distance between the antenna t and a first antenna of the device.

$d_r$ may represent a distance between the antenna r and a first antenna of the device.

$\theta_{t,0}$ may represent the angle of the beam at the antenna t at time $\tau_0$.

$\theta_{r,0}$ may represent the angle of the beam at the antenna r at time $\tau_0$.

$\theta_{t,1}$ may represent the angle of the beam at the antenna t at time $\tau_1$.

$\theta_{r,1}$ may represent the angle of the beam at the antenna r at time $\tau_1$.

The frequency domain response may then be estimated as:

$$H(\omega) = $$
$$e^{-j(\omega + \tilde{\omega})\left[\tau_0 + \frac{n_t d_t \sin(\theta_{t,0}) + n_r d_r \sin(\theta_{r,0})}{\lambda}\right]} + a_1 e^{-j(\omega + \tilde{\omega})\left[\tau_1 + \frac{n_t d_t \sin(\theta_{t,1}) + n_r d_r \sin(\theta_{r,1})}{\lambda}\right]}$$

Where $\tilde{\omega}$ may be from a Doppler effect.

A windowing function $W(\omega)$ may be used to maximize the amplitude of the main peak at the receiver device at $\tau_0$. For example, solving $\tau_0$: $\int W(\omega)H(\omega)e^{j\omega\tau_0}d\omega$ may have an energy constraint represented by $\int |W(\omega)|^2 d\omega = 1$ and a bandwidth constraint (by limiting the total out-of-band energy) may be represented by $$\int 1_{|\omega| > \omega_B} |W(\omega)|^2 d\omega \le \varepsilon.$$

Assuming $\int 1_{|\omega| > \omega_B} |W(\omega)|^2 d\omega = \varepsilon$ may result in a Lagrange. The Lagrange may be estimated as:

$$L = \int W(\omega)H(\omega)e^{j\omega\tau_0}d\omega + \lambda \int |W(\omega)|^2 d\omega + \lambda' \int 1_{|\omega| > \omega_B} |W(\omega)|^2 d\omega$$

Solving using variational calculus may result in:

$$\frac{dL}{dW(\omega)} = \int H(\omega)e^{j\omega\tau_0}d\omega + \lambda \int W^*(\omega)d\omega + \lambda' \int 1_{|\omega|>\omega_B} W^*(\omega)d\omega = 0$$

Such operations performed using multiple antennas may be done by beamforming at the receiver and the transmitter.

Diagram 606 illustrates a joint spectrum design that may be shaped by the windows in two domains. FIG. 6B is a diagram 650 illustrating an example of a 2-D range×velocity sensing spectrum having a windowing function applied to the 2-D sensing spectrum. The diagram 650 may have a windowing function applied to the spectrum to make it easier to measure the points 654, 656, and 658.

Joint spectrums of higher dimensions, such as three, four, or more dimensions may be constructed, such as a three-dimensional (3-D) joint design of a range spectrum, a speed spectrum, and an angle spectrum. A 3-D joint spectrum may be referred to as a cube spectrum or a radar cube. An exemplary 3-D joint spectrum may include a spectrum computing a range measurement, a speed measurement, and an angle measurement. It may be difficult to measure such spectrums, as the noise and interference from such spectrums may interfere with one another. In one aspect, FFT-based processing of a joint spectrum may result in "spreading" (e.g., range spreading, speed spreading, angle spreading), where power associated with a particular cell may be smeared into other cells due to high sidelobes, thereby interfering with spectra associated with other cells. For example, range spreading may smear power from one range cell to other range cells due to high sidelobes, thereby interfering with velocity spectra associated with other range cells. Applying windows to the spectrum may reduce noise and interference from such spectrum. For example, a set of windows may be applied to a joint spectrum to improve sensing target detection and parameter estimation. The set of windows may include at least one of (a) a rectangular window function, (b) a Hamming window function, (c) a raised-cosine window function, (d) a Parzen window function, (e) a Triangular window function, (f) a Welch window function, (g) a Hanning window function, (h) a Blackman window function, (i) a Nuttall window function, (j) a Blackman-Nuttal window function, (k) a Blackman-Harris window function, (l) a flat-top window function, (m) a Turkey window function, (n) a Kaiser window function, or (o) a Dolph-Chebyshev window function. A windowing function may have one or more roll-off factors, which may influence how fast a sidelobe drops, which may improve the resolution of a spectrum having such a windowing function applied to the spectrum. In some aspects, a first windowing function may be categorized as having a first highest sidelobe level, a first mainlobe width (e.g., −3 dB or −6 dB), and a first sidelobe roll-off rate, and a second windowing function may be categorized as having a second highest sidelobe level, a second mainlobe width, and a second sidelobe roll-off rate. An entity configured to measure a spectrum may be configured to select a windowing function based on the categorized parameters of the windowing function (e.g., a highest sidelobe level of a specified amount, or a sidelobe roll-off rate of a specified amount).

Each windowing function may capture a different view of the propagation channel, and may reveal information that the other windows may not capture. For example, a raised-cosine window function may optimally reduce noise for a spectrum to measure range, but a flat-top window function may optimally reduce noise for the same spectrum to measure speed. In other words, a windowing function may be understood as weighting the sensing data, or as weighting expressions of the sensing data in different domains. Each windowing function may reduce sidelobes for inter-range/Doppler/angle cell interference in different ways. As a result, a different windowing function may be applied to a joint spectrum to optimize different types of measurements.

In other words, a receiver sensing node may measure a joint spectrum (e.g., a range, speed, and angle spectrum) of a set of sensing signals. The receiver sensing node may apply a first windowing function to the joint spectrum, may apply a second windowing function to the joint spectrum, and may apply a third windowing function to the joint spectrum. At least two of the first, second, and third windowing functions may be the same, or each of the first, second, and third windowing functions may be different, improving parameter estimation in different ways. The receiver sensing node may perform detection of the target object and/or parameter estimation of the target object based on each of the windowed radar cubes. In some aspects, the receiver sensing mode may calculate a fast-Fourier transform (FFT) of each of the windowed radar cubes to formulate a 3D spectrum that may be used to perform detection of the target object and/or parameter estimation of the target object.

While such windowing functions may be used to optimize a joint spectrum, each sensing environment may have a different optimal windowing function. For example, a sensing environment in a first room with a first set of environmental factors (e.g., temperature, humidity, types of objects surrounding the target object, position of objects surrounding the target object) may have a first set of optimal windowing functions to estimate parameters of the target object, and a sensing environment in a second room with a second set of environmental factors may have a different set of optimal windowing functions to estimate parameters of the target object. As a result, coordination between sensing devices may be used to provide a robust and efficient sensing system to utilize windowing functions to detect a target object, or to estimate parameters of the target object (e.g., how far the target object is from a transmitter sensing node, how far the target object is from a receiver sensing node, a position or location of the target object, a speed of the target object). A wireless device configured to estimate one or more parameters of a target object may calculate the estimated parameters based on one or more functions based upon one or more measurements of an incoming set of RF signals. Such a function may calculate a parameter value within a level of tolerance or within a level of certainty/likelihood.

Figure 7:
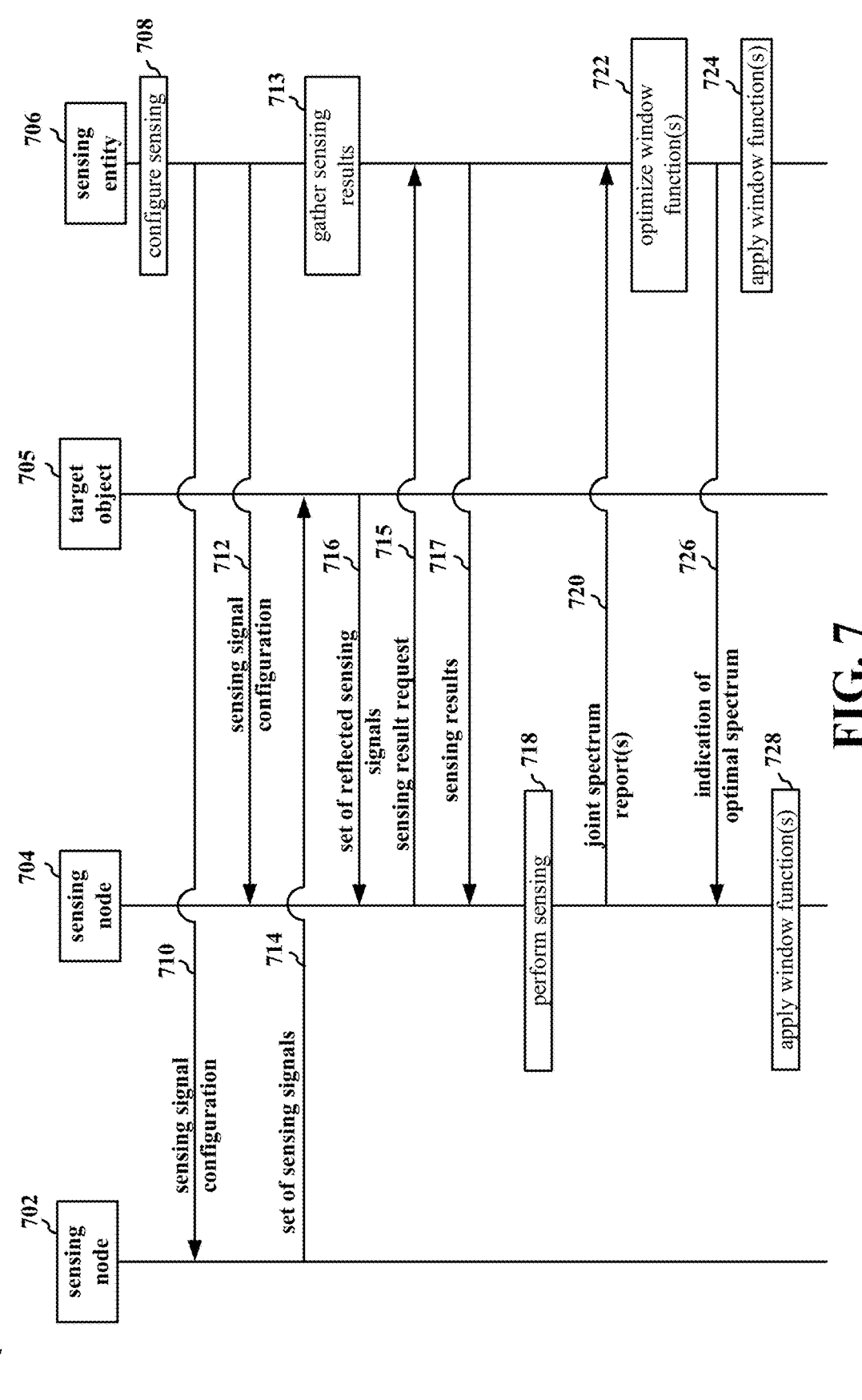
FIG. 7 is a connection flow diagram illustrating an example of a wireless system configured to apply windowing functions to sensing signal measurements.

FIG. 7 is a connection flow diagram 700 illustrating an example of a wireless system configured to apply windowing functions to sensing signal measurements. The sensing node 702, the sensing node 704, and the sensing entity 706 may be wireless devices, such as UEs or network nodes. The sensing node 702 may be a sensing transmitter. The sensing node 704 may be a sensing receiver. The sensing entity 706 may be configured to optimize windowing functions for sensing. The sensing entity 706 may be a sensing server, or an LMF.

At 708, the sensing entity 706 may configure sensing for the sensing node 702 and the sensing node 704. The sensing entity 706 may configure the sensing node 702 to transmit the set of sensing signals 714 to the target object 705, which may reflect off of the target object 705 to be received by the sensing node 704 as the set of reflected sensing signals 716.

The set of sensing signals 714 may travel to the target object 705 via one or more paths. The set of reflected sensing signals 716 may travel to the sensing node 704 via one or more paths. The sensing entity 706 may configure the sensing node 704 to receive the set of reflected sensing signals 716 and perform sensing at 718 in an optimal manner based on the environmental conditions of the target object 705.

The sensing entity 706 may transmit the sensing signal configuration 710 to the sensing node 702. The sensing node 702 may receive the sensing signal configuration 710. The sensing entity 706 may transmit the sensing signal configuration 712 to the sensing node 704. The sensing node 704 may receive the sensing signal configuration 712. The sensing node 702 may transmit a set of sensing signals 714 to the target object 705 based on the sensing signal configuration 710. The target object 705 may reflect the set of reflected sensing signals 716 to the sensing node 704.

At 718, the sensing node 704 may perform sensing on the set of reflected sensing signals based on the sensing signal configuration 712.

In one aspect, the sensing node 704 may be configured to perform windowing optimization. The sensing node 704 may be configured to execute algorithms, such as machine-learning (ML) algorithms, to optimize the windowing functions applied to a joint sensing spectrum. The overhead and latency of detecting the target object 705, or calculating parameters of the target object 705, may be reduced as the processing is performed at the edge of the network. However, the power and resource specifications of the sensing node 704 may be increased.

In some aspects, the sensing entity 706 may have some sensing results of the target object 705 already from other sensing nodes, which may aid in training an ML algorithm at the sensing node 704. The sensing entity 706 may gather such sensing results at 713 from other network nodes, such as other receiver nodes that receive sensing signals reflected off of the target object 705, or from crowd-sourced data from other networks or other sensing servers. In some aspects, the sensing entity 706 may transmit such sensing results to the sensing node 704 as the sensing signal configuration 712. In other aspects, the sensing entity 706 may transmit such sensing results to the sensing node 704 as the sensing results 717, for example where the sensing results 717 may be from other sensing nodes that received another set of reflected sensing signals reflected from the set of sensing signals 714 reflecting off of the target object 705. The sensing node 704 may then train the ML algorithm at 718 to improve the types of windowing functions selected to perform sensing of target objects in the environment about the target object 705. In some aspects, the sensing entity 706 may be configured to dynamically transmit the sensing results 717 to the sensing node 704 as it receives them. In other aspects, the sensing entity 706 may be configured to periodically transmit the sensing results 717 to the sensing node 704 in accordance with a schedule. In other aspects, sensing entity 706 may be configured to transmit the sensing results 717 to the sensing node 704 in response to receiving a sensing result request 715 from the sensing node 704. The sensing node 704 may request sensing target information about the target object 705 from the sensing entity 706 via the sensing result request 715. The sensing result request 715 may request sensing results based on attributes of a location area (e.g., the location area of the sensing node 704 or the location area of the target object 705), a beam direction (e.g., the AoA of the set of reflected sensing signals 716, an AoD of the set of sensing signals 714), a scope of a range to be measured, a scope of a speed to be measured, or a scope of an angle to be measured. Such sensing target information may be referred to as genie sensing target information. The genie sensing target information may be based on an analysis of an algorithm at the sensing entity 706, for example on a large amount of data generated in the network on the target object 705 and/or other target objects in similar environments to the target object 705. The sensing node 704 may use such genie sensing target information as the input of its ML algorithm to train the ML algorithm. In other aspects, the sensing node 704 may use the genie sensing target information as the input of its ML algorithm to calculate a set of windowing functions to apply to a joint spectrum measured based on the set of reflected sensing signals 716. The sensing node 704 may transmit a set of joint spectrum reports 720 to the sensing entity 706 based on its sensing performed at 718. The sensing entity 706 may receive the set of joint spectrum reports 720. The set of joint spectrum reports 720 may include a detection result of detecting the target object 705, a set of calculated parameters of the target object 705, a set of ML algorithms trained by the sensing node 704 based on the sensing data, and/or a calculated position or location of the target object 705. In some aspects, the sensing node 704 may derive a set of weights to be applied to each of the set of joint spectrum to optimally fuse the set of joint spectrum to an optimal joint spectrum for sensing the target object 705. The sensing entity 706 may share such sensing results, or a portion of such sensing results, with other sensing nodes to improve their sensing performance of objects in environments similar to the target object 705.

In another aspect, the sensing node 704 may be configured to report an estimated sensing spectrum to the sensing entity 706, and the sensing entity 706 may execute algorithms to calculate optimal windowing functions to apply to the sensing spectrum. In other words, the sensing node 704 may calculate a set of joint spectrums based on the set of reflected sensing signals 716 at 718. The sensing node 704 may apply windowing functions to each of the set of joint spectrums. The sensing node 704 may transmit the set of joint spectrum reports 720 to the sensing entity. The sensing entity 706 may receive the set of joint spectrum reports 720. The set of joint spectrum reports may include a set of joint spectrums, such as a set of joint spectrums with different windowing functions applied to a measured joint spectrum, and/or one or more combined joint spectrums merged from a set of windowing functions. The combined joint spectrum may be calculated as a result of FFT processing. The different windowing functions applied to the measured joint spectrum may be indicated in the sensing signal configuration 712, or may be selected by the sensing node 704 in accordance with an algorithm (e.g., an ML algorithm), at the sensing node 704. The sensing entity 706 may analyze the set of joint spectrums to determine which joint spectrum may be optimal to measure one or more parameters of the target object 705.

To aid the sensing entity 706 in analyzing the set of joint spectrums, the set of joint spectrum reports 720 may include (a) an indication of a sensing node identifier (ID) associated with the sensing node 704, (b) an indication of an RS ID associated with the set of reflected sensing signals 716 or the set of sensing signals 714, (c) an indication of a location associated with the sensing node 704, and/or (d) an indication of a spectrum ID associated with each of the set of joint spectrums. In some aspects, the sensing node ID may be a serving cell ID. In some aspect, the sensing node ID may be a UE ID. The spectrum ID may indicate which windowing function was applied to the joint spectrum.

At 722, the sensing entity 706 may analyze the set of joint spectrum reports 720 to determine an optimal sensing spectrum, or a set of optimal windowing functions to apply to a joint spectrum to obtain an optimal sensing spectrum, or a set of optimal windowing functions to apply to a joint spectrum which may be combined to formulate a combined joint sensing spectrum (e.g., using FFT processing). At 724, the sensing entity 706 may conduct the remaining sensing processing, including sensing target detection of the target object 705 and/or parameter estimation of the target object 705. In some aspects, the sensing entity 706 may apply one or more window functions to the set of joint spectrum reports, optimizing the spectrums for analysis. The sensing entity 706 may fuse measurements from multiple sensing nodes, such as the sensing node 704, to train an ML algorithm, or to use an ML algorithm to perform target detection of the target object 705 and/or parameter estimation of the target object 705. In some aspects, the sensing entity 706 may conduct the remaining processing at 724 where an optimal sensing spectrum may not be expressed as a linear combination of spectrums reported by the sensing node 704, but may be expressed as a combination of spectrums reported by both the sensing node 704 and other sensing nodes receiving reflected sensing signals from the target object 705.

In some aspects, the sensing entity 706 may transmit an indication 726 of the optimal sensing spectrum calculated at 722. The sensing node 704 may receive the indication 726 of the optimal sensing spectrum. The indication 726 of the optimal sensing spectrum may indicate to the sensing node 704 how to select an optimal sensing spectrum to perform target detection of the target object 705 and/or parameter estimation of the target object 705. At 728, the sensing node may apply a set of windowing functions based on the indication 726 of the optimal spectrum to perform target detection of the target object 705 and/or parameter estimation of the target object 705. In one aspect, the indication 726 of the optimal spectrum may include a spectrum ID of the optimal sensing spectrum. In another aspect, the indication 726 of the optimal spectrum may include a set of weights that may be used to guide the sensing node 704 to combine the set of joint sensing spectrum from the set of joint spectrum reports 720 to create an optimal sensing spectrum. For example, the set of joint sensing spectrums, may include three joint spectrums, and the indication 726 of the optimal spectrum may include a weight for each of the joint spectrums, applied during FFT processing of the joint spectrums to create an optimal joint spectrum. In another aspect, the indication 726 may include an algorithm representing a linear combination of spectrums of the set of joint spectrums to generate the optimal joint spectrum. In one aspect, the indication 726 of the optimal spectrum may include the optimal spectrum calculated by the sensing entity 706 at 722. In one aspect, the indication 726 of the optimal spectrum may include a calculated detection of the target object 705 or a set of calculated parameters of the target object 705 based on the optimal spectrum calculated at 722.

FIG. 8 is a flowchart 800 of a method of wireless communication. The method may be performed by a sensing node (e.g., the UE 104, the UE 350; the base station 102, the base station 310; the sensing node 702, the sensing node 704; the apparatus 1204; the network entity 1202, 1302, 1460). At 802, the sensing node may receive a set of sensing signals. For example, 802 may be performed by the sensing node 704 in FIG. 7, which may receive the set of reflected sensing signals 716. Moreover, 802 may be performed by the component 198 in FIG. 1, 3, 12, 13, or 14.

At 804, the sensing node may calculate a first joint spectrum associated with a target object based on a first windowing function and the set of sensing signals. For example, 804 may be performed by the sensing node 704 in FIG. 7, which may, at 718, calculate a first joint spectrum associated with the target object 705 based on a first windowing function and the set of reflected sensing signals 716. The first windowing function may be indicated in the sensing signal configuration 712, the sensing results 717, or an ML algorithm of the sensing node 704. Moreover, 804 may be performed by the component 198 in FIG. 1, 3, 12, 13, or 14.

At 806, the sensing node may calculate a second joint spectrum associated with the target object based on a second windowing function and the set of sensing signals. The first windowing function may be different than the second windowing function. For example, 806 may be performed by the sensing node 704 in FIG. 7, which, at 718, may calculate a second joint spectrum associated with the target object 705 based on a second windowing function and the set of reflected sensing signals 716. The first windowing function may be different than the second windowing function. Moreover, 806 may be performed by the component 198 in FIG. 1, 3, 12, 13, or 14.

Figure 9:
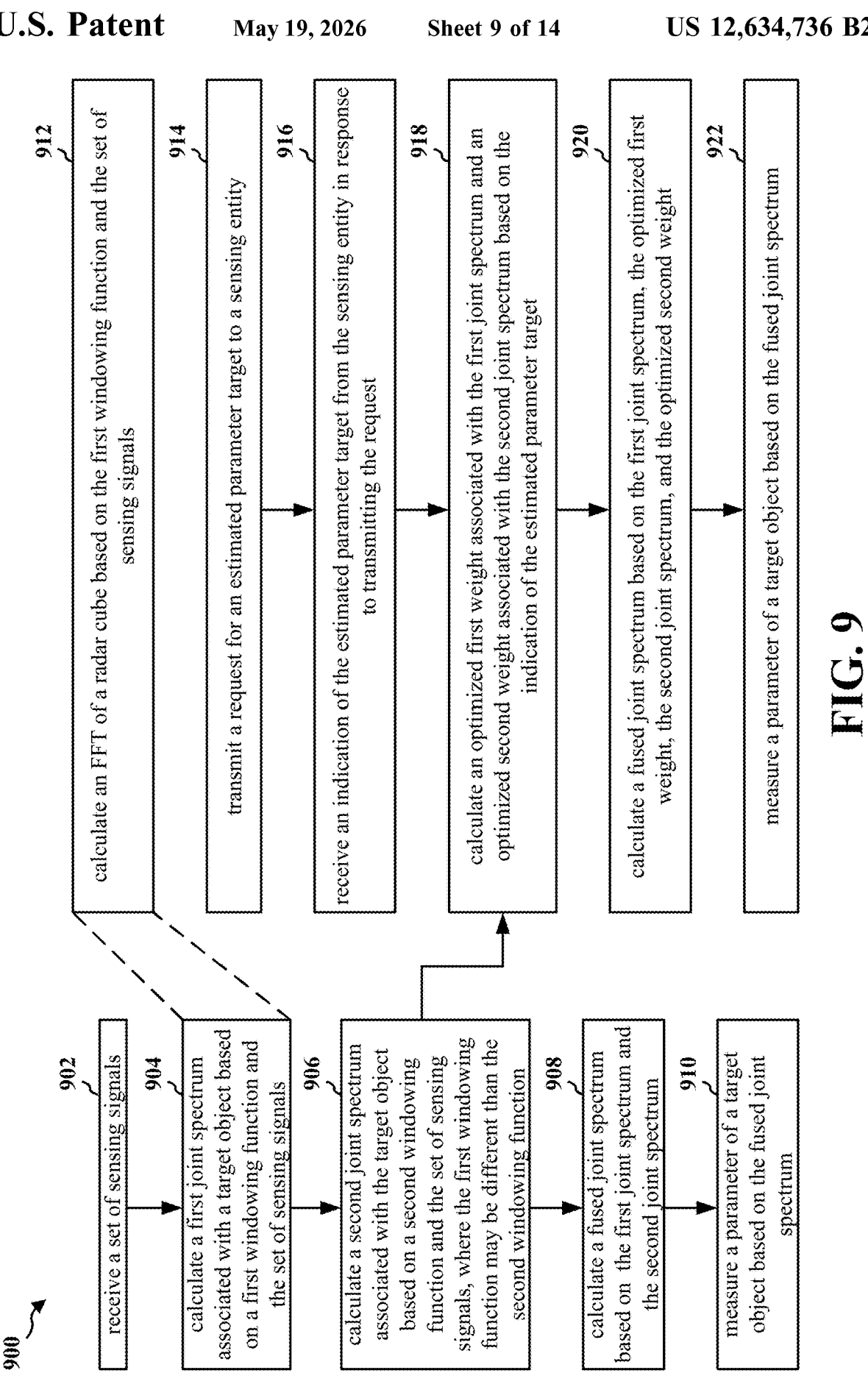
FIG. 9 is a flowchart of a method of wireless communication.

FIG. 9 is a flowchart 900 of a method of wireless communication. The method may be performed by a sensing node (e.g., the UE 104, the UE 350; the base station 102, the base station 310; the sensing node 702, the sensing node 704; the apparatus 1204; the network entity 1202, 1302, 1460). At 902, the sensing node may receive a set of sensing signals. For example, 902 may be performed by the sensing node 704 in FIG. 7, which may receive the set of reflected sensing signals 716. Moreover, 902 may be performed by the component 198 in FIG. 1, 3, 12, 13, or 14.

At 904, the sensing node may calculate a first joint spectrum associated with a target object based on a first windowing function and the set of sensing signals. For example, 904 may be performed by the sensing node 704 in FIG. 7, which may, at 718, calculate a first joint spectrum associated with the target object 705 based on a first windowing function and the set of reflected sensing signals 716. The first windowing function may be indicated in the sensing signal configuration 712, the sensing results 717, or an ML algorithm of the sensing node 704. Moreover, 904 may be performed by the component 198 in FIG. 1, 3, 12, 13, or 14.

At 906, the sensing node may calculate a second joint spectrum associated with the target object based on a second windowing function and the set of sensing signals. The first windowing function may be different than the second windowing function. For example, 906 may be performed by the sensing node 704 in FIG. 7, which may, at 718, calculate a second joint spectrum associated with the target object 705 based on a second windowing function and the set of reflected sensing signals 716. The first windowing function may be different than the second windowing function. Moreover, 906 may be performed by the component 198 in FIG. 1, 3, 12, 13, or 14.

At 908, the sensing node may calculate a fused joint spectrum based on the first joint spectrum and the second joint spectrum. For example, 908 may be performed by the sensing node 704 in FIG. 7, which may, at 718 or at 728, calculate a fused joint spectrum based on the first joint spectrum and the second joint spectrum. Moreover, 908 may be performed by the component 198 in FIG. 1, 3, 12, 13, or 14.

At 910, the sensing node may measure a parameter of a target object based on the fused joint spectrum. For example, 910 may be performed by the sensing node 704 in FIG. 7, which may, at 718 or at 728, measure a parameter of a target object based on the fused joint spectrum. Moreover, 910 may be performed by the component 198 in FIG. 1, 3, 12, 13, or 14.

At 912, the sensing node may calculate an FFT of a radar cube based on the first windowing function and the set of sensing signals. For example, 912 may be performed by the sensing node 704 in FIG. 7, which may, at 718 or at 728, calculate an FFT of a radar cube based on the first window-ing function and the set of reflected sensing signals 716. Moreover, 912 may be performed by the component 198 in FIG. 1, 3, 12, 13, or 14.

At 914, the sensing node may transmit a request for an estimated target parameter to a sensing entity. For example, 914 may be performed by the sensing node 704 in FIG. 7, which may transmit the sensing result request 715 for an estimated target parameter associated with the target object 705 to the sensing entity 706. Moreover, 914 may be performed by the component 198 in FIG. 1, 3, 12, 13, or 14.

At 916, the sensing node may receive an indication of the estimated target parameter from the sensing entity in response to transmitting the request. For example, 916 may be performed by the sensing node 704 in FIG. 7, which may receive an indication of the estimated target parameter as the sensing results 717 from the sensing entity 706 in response to transmitting the sensing result request 715. Moreover, 916 may be performed by the component 198 in FIG. 1, 3, 12, 13, or 14.

At 918, the sensing node may calculate an optimized first weight associated with the first joint spectrum and an optimized second weight associated with the second joint spectrum based on the indication of the estimated target parameter. For example, 918 may be performed by the sensing node 704 in FIG. 7, which may, at 718 or at 728, calculate an optimized first weight associated with the first joint spectrum and an optimized second weight associated with the second joint spectrum based on the indication of the estimated target parameter in the sensing results 717. More-over, 918 may be performed by the component 198 in FIG. 1, 3, 12, 13, or 14.

At 920, the sensing node may calculate a fused joint spectrum based on the first joint spectrum, the optimized first weight, the second joint spectrum, and the optimized second weight. For example, 920 may be performed by the sensing node 704 in FIG. 7, which may, at 718 or at 728, calculate a fused joint spectrum based on the first joint spectrum, the optimized first weight, the second joint spec-trum, and the optimized second weight. Moreover, 920 may be performed by the component 198 in FIG. 1, 3, 12, 13, or 14.

At 922, the sensing node may measure a parameter of a target object based on the fused joint spectrum. For example, 922 may be performed by the sensing node 704 in FIG. 7, which may measure a parameter of the target object 705 based on the fused joint spectrum. Moreover, 922 may be performed by the component 198 in FIG. 1, 3, 12, 13, or 14.

FIG. 10 is a flowchart 1000 of a method of wireless communication. The method may be performed by a sensing entity (e.g., the UE 104, the UE 350; the base station 102, the base station 310; the sensing entity 706; the apparatus 1204; the network entity 1202, 1302, 1460). At 1002, the sensing entity may receive a first joint spectrum report based on a first joint spectrum associated with a target object and a first windowing function from a sensing node. For example, 1002 may be performed by the sensing entity 706 in FIG. 7, which may receive a first joint spectrum report in the set of joint spectrum reports 720 based on a first joint spectrum associated with the target object 705 and a first windowing function from the sensing node 704. Moreover, 1002 may be performed by the component 199 in FIG. 1, 3, 12, 13, or 14.

At 1004, the sensing entity may receive a second joint spectrum report based on a second joint spectrum associated with the target object and a second windowing function from the sensing node. For example, 1004 may be performed by the sensing entity 706 in FIG. 7, which may receive a second joint spectrum report in the set of joint spectrum reports 720 based on a second joint spectrum associated with the target object 705 and a second windowing function from the sensing node 704. Moreover, 1004 may be performed by the component 199 in FIG. 1, 3, 12, 13, or 14.

Figure 11:
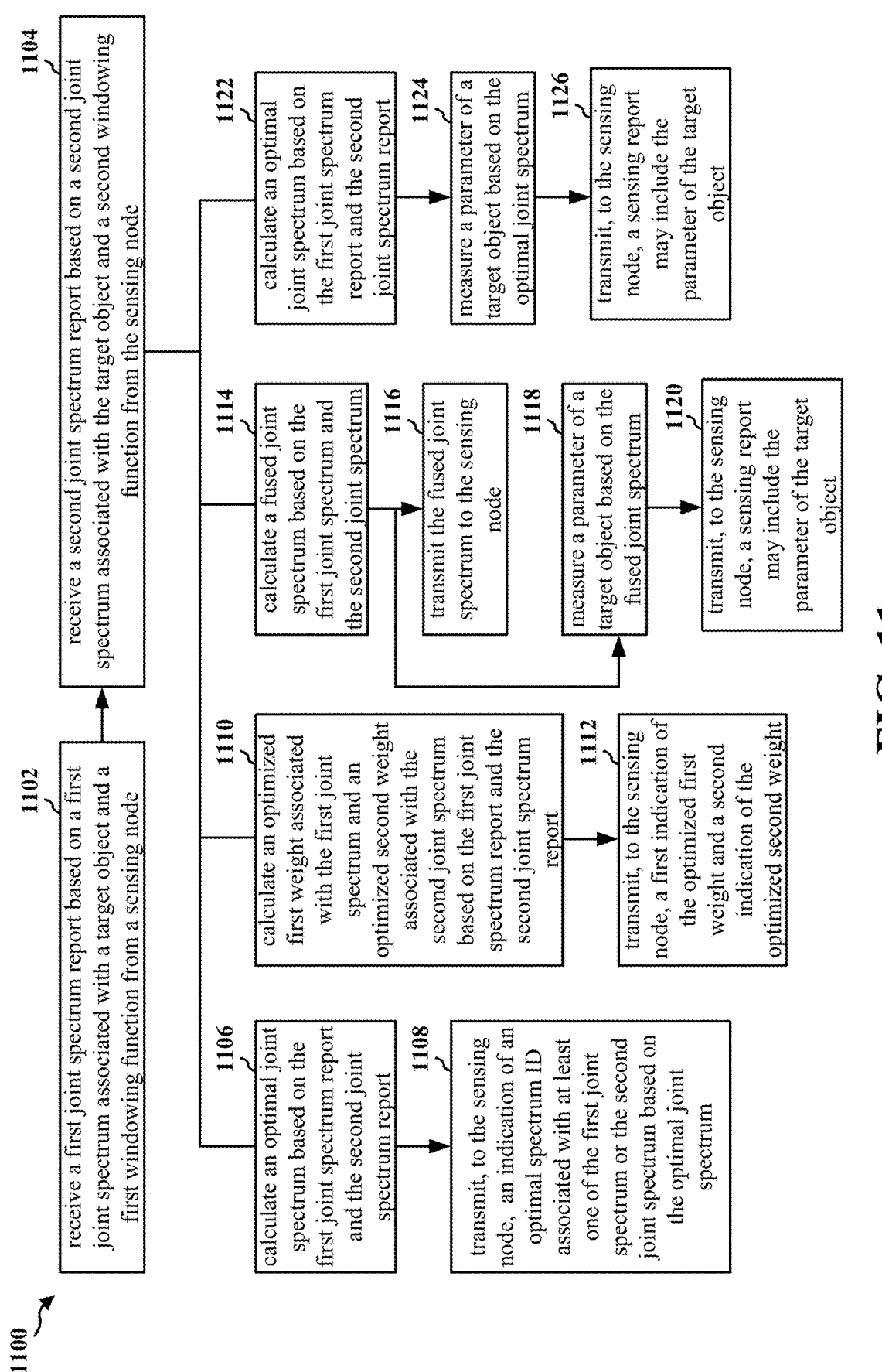
FIG. 11 is a flowchart of a method of wireless communication.

FIG. 11 is a flowchart 1100 of a method of wireless communication. The method may be performed by a sensing entity (e.g., the UE 104, the UE 350; the base station 102, the base station 310; the sensing entity 706; the apparatus 1204; the network entity 1202, 1302, 1460). At 1102, the sensing entity may receive a first joint spectrum report based on a first joint spectrum associated with a target object and a first windowing function from a sensing node. For example, 1102 may be performed by the sensing entity 706 in FIG. 7, which may receive a first joint spectrum report in the set of joint spectrum reports 720 based on a first joint spectrum associated with the target object 705 and a first windowing function from the sensing node 704. Moreover, 1102 may be performed by the component 199 in FIG. 1, 3, 12, 13, or 14.

At 1104, the sensing entity may receive a second joint spectrum report based on a second joint spectrum associated with the target object and a second windowing function from the sensing node. For example, 1104 may be performed by the sensing entity 706 in FIG. 7, which may receive a second joint spectrum report in the set of joint spectrum reports 720 based on a second joint spectrum associated with the target object 705 and a second windowing function from the sensing node 704. Moreover, 1104 may be performed by the component 199 in FIG. 1, 3, 12, 13, or 14.

At 1106, the sensing entity may calculate an optimal joint spectrum based on the first joint spectrum report and the second joint spectrum report. For example, 1106 may be performed by the sensing entity 706 in FIG. 7, which may, at 722, calculate an optimal joint spectrum based on the first joint spectrum report and the second joint spectrum report in the set of joint spectrum reports 720. Moreover, 1106 may be performed by the component 199 in FIG. 1, 3, 12, 13, or 14.

At 1108, the sensing entity may transmit, to the sensing node via the transceiver, an indication of an optimal spec-trum ID associated with at least one of the first joint spectrum or the second joint spectrum based on the optimal joint spectrum. For example, 1108 may be performed by the sensing entity 706 in FIG. 7, which may transmit, to the sensing node 704, an indication of an optimal spectrum ID in the indication 726 of the optimal spectrum associated with at least one of the first joint spectrum or the second joint spectrum based on the optimal joint spectrum calculated at 722. Moreover, 1108 may be performed by the component 199 in FIG. 1, 3, 12, 13, or 14.

At 1110, the sensing entity may calculate an optimized first weight associated with the first joint spectrum and an optimized second weight associated with the second joint spectrum based on the first joint spectrum report and the second joint spectrum report. For example, 1110 may be performed by the sensing entity 706 in FIG. 7, which may, at 722 or 724, calculate an optimized first weight associated with the first joint spectrum and an optimized second weight associated with the second joint spectrum based on the first joint spectrum report and the second joint spectrum report in the set of joint spectrum reports 720. Moreover, 1110 may be performed by the component 199 in FIG. 1, 3, 12, 13, or 14.

At 1112, the sensing entity may transmit, to the sensing node, a first indication of the optimized first weight and a second indication of the optimized second weight. For example, 1112 may be performed by the sensing entity 706 in FIG. 7, which may transmit, to the sensing node 704, a first indication of the optimized first weight and a second indication of the optimized second weight in the indication 726 of the optimal spectrum. Moreover, 1112 may be performed by the component 199 in FIG. 1, 3, 12, 13, or 14.

At 1114, the sensing entity may calculate a fused joint spectrum based on the first joint spectrum and the second joint spectrum. For example, 1114 may be performed by the sensing entity 706 in FIG. 7, which may, at 724, calculate a fused joint spectrum based on the first joint spectrum and the second joint spectrum. Moreover, 1114 may be performed by the component 199 in FIG. 1, 3, 12, 13, or 14.

At 1116, the sensing entity may transmit the fused joint spectrum to the sensing node. For example, 1116 may be performed by the sensing entity 706 in FIG. 7, which may transmit the fused joint spectrum to the sensing node as the indication 726 of the optimal joint spectrum or as the sensing results 717. Moreover, 1116 may be performed by the component 199 in FIG. 1, 3, 12, 13, or 14.

At 1118, the sensing entity may measure a parameter of a target object based on the fused joint spectrum. For example, 1118 may be performed by the sensing entity 706 in FIG. 7, which may, at 724, measure a parameter of the target object 705 based on the fused joint spectrum. Moreover, 1118 may be performed by the component 199 in FIG. 1, 3, 12, 13, or 14.

At 1120, the sensing entity may transmit, to the sensing node, a sensing report may include the parameter of the target object. For example, 1120 may be performed by the sensing entity 706 in FIG. 7, which may transmit, to the sensing node 704, a sensing report in the sensing results 717 which may include the parameter of the target object 705. Moreover, 1120 may be performed by the component 199 in FIG. 1, 3, 12, 13, or 14.

At 1122, the sensing entity may calculate an optimal joint spectrum based on the first joint spectrum report and the second joint spectrum report. For example, 1122 may be performed by the sensing entity 706 in FIG. 7, which may, at 722 or 724, calculate an optimal joint spectrum based on the first joint spectrum report and the second joint spectrum report. Moreover, 1122 may be performed by the component 199 in FIG. 1, 3, 12, 13, or 14.

At 1124, the sensing entity may measure a parameter of a target object based on the optimal joint spectrum. For example, 1124 may be performed by the sensing entity 706 in FIG. 7, which may, at 722 or 724, measure a parameter of the target object 705 based on the optimal joint spectrum. Moreover, 1124 may be performed by the component 199 in FIG. 1, 3, 12, 13, or 14.

At 1126, the sensing entity may transmit, to the sensing node, a sensing report may include the parameter of the target object. For example, 1126 may be performed by the sensing entity 706 in FIG. 7, which may transmit, to the sensing node 704, a sensing report as the indication 726 of the optimal spectrum or as the sensing results 717, which may include the parameter of the target object 705. Moreover, 1126 may be performed by the component 199 in FIG. 1, 3, 12, 13, or 14.

Figure 12:
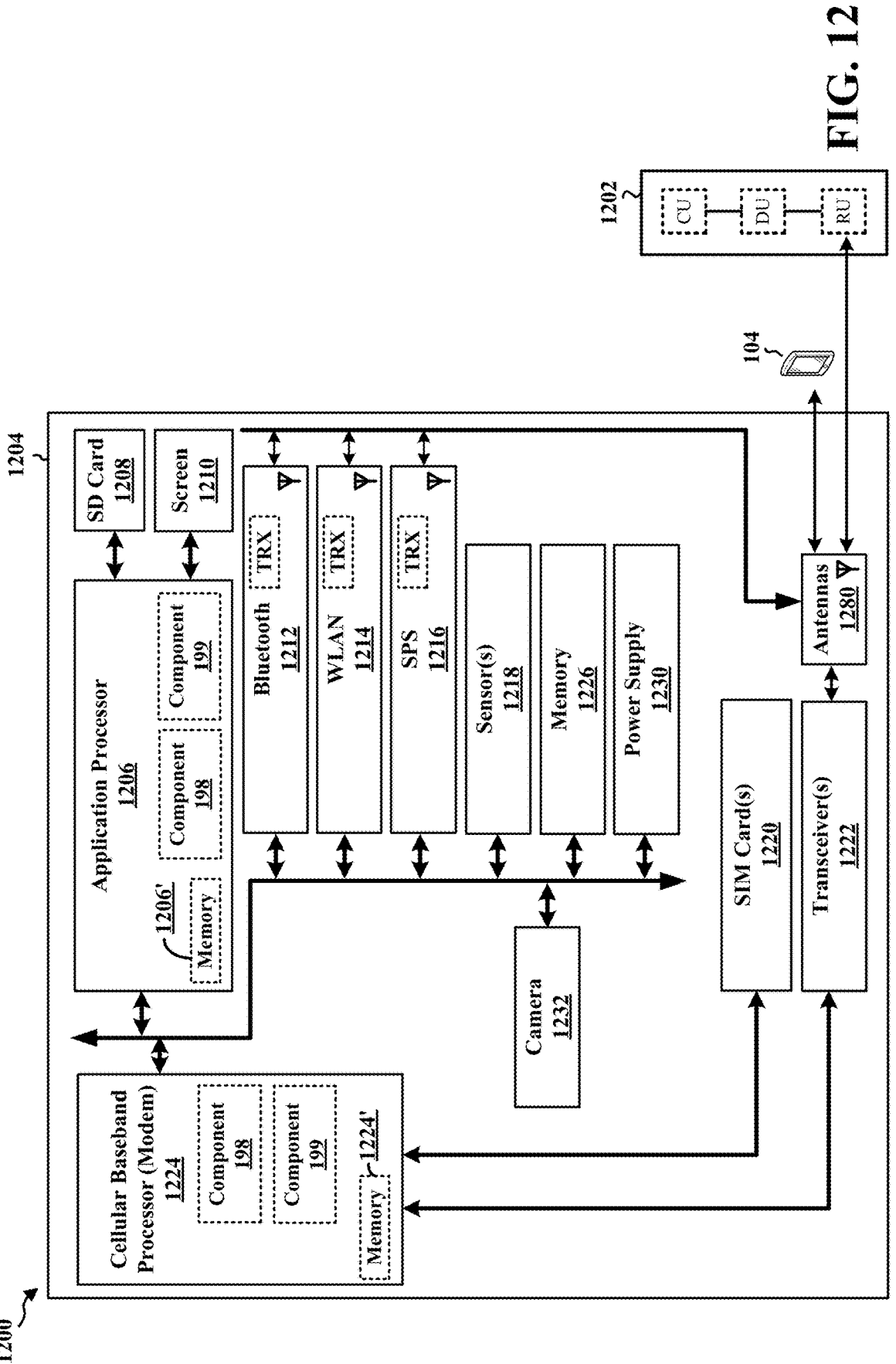
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 may be configured to receive a set of sensing signals. The component 198 may be configured to calculate a first joint spectrum associated with a target object based on a first windowing function and the set of sensing signals. The component 198 may be configured to calculate a second joint spectrum associated with the target object based on a second windowing function and the set of sensing signals. The first windowing function may be different than the second windowing function. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for receiving a set of sensing signals. The apparatus 1204 may include means for calculating a first joint spectrum associated with a target object based on a first windowing function and the set of sensing signals. The apparatus 1204 may include means for calculating a second joint spectrum associated with the target object based on a second windowing function and the set of sensing signals. The first windowing function may be different than the second windowing function. The first joint spectrum may include a range spectrum, a Doppler spectrum, and an angle spectrum. The first windowing function may include a first highest side lobe level, a first main lobe width, and a first sidelobe roll-off rate. The second windowing function may include a second highest side lobe level, a second main lobe width, and a second sidelobe roll-off rate. The first highest side lobe level may be different than the second highest side lobe level. The first main lobe width may be different than the second main lobe width. The first sidelobe roll-off rate may be different than the second sidelobe roll-off rate. The apparatus 1204 may include means for calculating the first joint spectrum may include calculating a FFT of a radar cube based on the first windowing function and the set of sensing signals. The first windowing function may include at least one of (a) a rectangular window function, (b) a Hamming window function, (c) a raised-cosine window function, (d) a Parzen window function, (e) a Triangular window function, (f) a Welch window function, (g) a Hanning window function, (h) a Blackman window function, (i) a Nuttall window function, (j) a Blackman-Nuttal window function, (k) a Blackman-Harris window function, (l) a flat-top window function, (m) a Turkey window function, (n) a Kaiser window function, or (o) a Dolph-Chebyshev window function. The apparatus 1204 may include means for calculating a fused joint spectrum based on the first joint spectrum and the second joint spectrum. The apparatus 1204 may include means for measuring a parameter of a target object based on the fused joint spectrum. The parameter of the target object may include a distance of the sensing node from the target object, a speed of the target object, or an angle of the target object relative to the sensing node. The apparatus 1204 may include means for transmitting a first joint spectrum report based on the first joint spectrum to a sensing entity. The apparatus 1204 may include means for transmitting a second joint spectrum report based on the second joint spectrum to the sensing entity. The first joint spectrum report may include at least one of (a) a first indication of a sensing node identifier (ID) associated with the sensing node, (b) a second indication of a reference signal (RS) ID associated with the set of sensing signals, (c) a third indication of a location associated with the sensing node, or (d) a fourth indication of a spectrum ID associated with the first joint spectrum. The apparatus 1204 may include means for receiving an indication of an optimal spectrum ID associated with at least one of the first joint spectrum or the second joint spectrum from the sensing entity. The apparatus 1204 may include means for measuring a parameter of a target object based on the optimal spectrum ID in response to receiving the indication of the optimal spectrum ID. The apparatus 1204 may include means for receiving an indication of a first weight associated with the first joint spectrum and a second weight associated with the second joint spectrum. The apparatus 1204 may include means for calculating a fused joint spectrum based on the first joint spectrum, the first weight, the second joint spectrum, and the second weight in response to receiving the indication of the first weight and the second weight. The apparatus 1204 may include means for measuring a parameter of a target object based on the fused joint spectrum. The apparatus 1204 may include means for receiving, from the sensing entity, a fused joint spectrum based on the first joint spectrum or the second joint spectrum. The apparatus 1204 may include means for measuring a parameter of a target object based on the fused joint spectrum. The apparatus 1204 may include means for receiving, from the sensing entity, a sensing report including a parameter of a target object based on the first joint spectrum or the second joint spectrum. The apparatus 1204 may include means for calculating an optimized first weight associated with the first joint spectrum and an optimized second weight associated with the second joint spectrum based on the first joint spectrum and the second joint spectrum. The apparatus 1204 may include means for calculating a fused joint spectrum based on the first joint spectrum, the optimized first weight, the second joint spectrum, and the optimized second weight. The apparatus 1204 may include means for measuring a parameter of a target object based on the fused joint spectrum. The apparatus 1204 may include means for calculating the optimized first weight and the optimized second weight by calculating the optimized first weight associated with the first joint spectrum and the optimized second weight associated with the second joint spectrum further based on a previous measured parameter of the target object. The apparatus 1204 may include means for receiving the previous measured parameter from a sensing entity. The apparatus 1204 may include means for transmitting a request for an estimated target parameter to a sensing entity. The apparatus 1204 may include means for receiving an indication of the estimated target parameter from the sensing entity in response to transmitting the request. The apparatus 1204 may include means for calculating an optimized first weight associated with the first joint spectrum and an optimized second weight associated with the second joint spectrum based on the indication of the estimated target parameter. The apparatus 1204 may include means for calculating a fused joint spectrum based on the first joint spectrum, the optimized first weight, the second joint spectrum, and the optimized second weight. The apparatus 1204 may include means for measuring a parameter of a target object based on the fused joint spectrum. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to receive a first joint spectrum report based on a first joint spectrum associated with a target object and a first windowing function from a sensing node. The component 199 may be configured to receive a second joint spectrum report based on a second joint spectrum associated with the target object and a second windowing function from the sensing node. The component 199 may be within the cellular baseband processor 1224, the application processor 1206, or both the cellular baseband processor 1224 and the application processor 1206. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for receiving a first joint spectrum report based on a first joint spectrum associated with a target object and a first windowing function from a sensing node. The apparatus 1204 may include means for receiving a first joint spectrum report based on a first joint spectrum associated with a target object and a first windowing function from a sensing node. The apparatus 1204 may include means for receiving a second joint spectrum report based on a second joint spectrum associated with the target object and a second windowing function from the sensing node. The first joint spectrum report may include at least one of (a) a first indication of a sensing node ID associated with the sensing node, (b) a second indication of a RS ID associated with a set of sensing signals, (c) a third indication of a location associated with the sensing node, or (d) a fourth indication of a spectrum ID associated with the first joint spectrum. The apparatus 1204 may include means for calculating an optimal joint spectrum based on the first joint spectrum report and the second joint spectrum report. The apparatus 1204 may include means for transmitting, to the sensing node, an indication of an optimal spectrum ID associated with at least one of the first joint spectrum or the second joint spectrum based on the optimal joint spectrum. The apparatus 1204 may include means for calculating an optimized first weight associated with the first joint spectrum and an optimized second weight associated with the second joint spectrum based on the first joint spectrum report and the second joint spectrum report. The apparatus 1204 may include means for transmitting, to the sensing node, a first indication of the optimized first weight and a second indication of the optimized second weight. The apparatus 1204 may include means for calculating a fused joint spectrum based on the first joint spectrum and the second joint spectrum. The apparatus 1204 may include means for transmitting the fused joint spectrum to the sensing node. The apparatus 1204 may include means for calculating a fused joint spectrum based on the first joint spectrum and the second joint spectrum. The apparatus 1204 may include means for measuring a parameter of a target object based on the fused joint spectrum. The apparatus 1204 may include means for transmitting, to the sensing node, a sensing report including the parameter of the target object. The apparatus 1204 may include means for calculating an optimal joint spectrum based on the first joint spectrum report and the second joint spectrum report. The apparatus 1204 may include means for measuring a parameter of a target object based on the optimal joint spectrum. The apparatus 1204 may include means for transmitting, to the sensing node, a sensing report including the parameter of the target object. The apparatus 1204 may include means for calculating an optimized first weight associated with the first joint spectrum and an optimized second weight associated with the second joint spectrum based on the first joint spectrum and the second joint spectrum. The apparatus 1204 may include means for calculating a fused joint spectrum based on the first joint spectrum, the optimized first weight, the second joint spectrum, and the optimized second weight. The apparatus 1204 may include means for measuring a parameter of a target object based on the fused joint spectrum. The apparatus 1204 may include means for transmitting, to the sensing node, a sensing report including the parameter of the target object. The apparatus 1204 may include means for receiving a third joint spectrum report based on a third joint spectrum from a third sensing node. The apparatus 1204 may include means for calculating a fused joint spectrum based on the first joint spectrum report, the second joint spectrum report, and the third joint spectrum report. The apparatus 1204 may include means for measuring a parameter of a target object based on the fused joint spectrum. The means may be the component 199 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
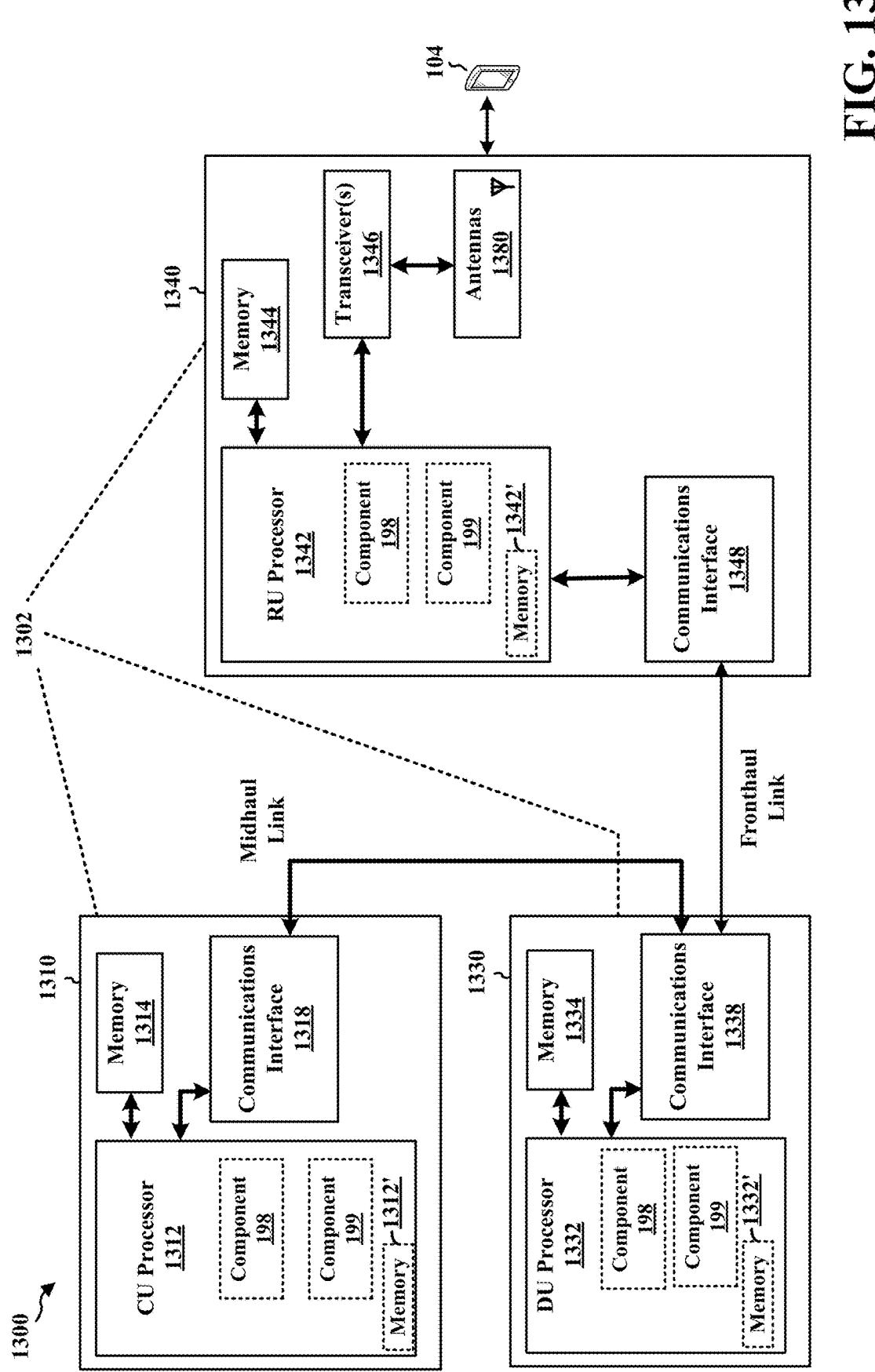
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a set of sensing signals. The component 198 may be configured to calculate a first joint spectrum associated with a target object based on a first windowing function and the set of sensing signals. The component 198 may be configured to calculate a second joint spectrum associated with the target object based on a second windowing function and the set of sensing signals. The first windowing function may be different than the second windowing function. The component 198 may be within one or more processors of one or more of the CU 1310, DU 1330, and the RU 1340. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for receiving a set of sensing signals. The network entity 1302 may include means for calculating a first joint spectrum associated with a target object based on a first windowing function and the set of sensing signals. The network entity 1302 may include means for calculating a second joint spectrum associated with the target object based on a second windowing function and the set of sensing signals. The first windowing function may be different than the second windowing function. The first joint spectrum may include a range spectrum, a Doppler spectrum, and an angle spectrum. The first windowing function may include a first highest side lobe level, a first main lobe width, and a first sidelobe roll-off rate. The second windowing function may include a second highest side lobe level, a second main lobe width, and a second sidelobe roll-off rate. The first highest side lobe level may be different than the second highest side lobe level. The first main lobe width may be different than the second main lobe width. The first sidelobe roll-off rate may be different than the second sidelobe roll-off rate. The network entity 1302 may include means for calculating the first joint spectrum may include calculating a FFT of a radar cube based on the first windowing function and the set of sensing signals. The first windowing function may include at least one of (a) a rectangular window function, (b) a Hamming window function, (c) a raised-cosine window function, (d) a Parzen window function, (e) a Triangular window function, (f) a Welch window function, (g) a Hanning window function, (h) a Blackman window function, (i) a Nuttall window function, (j) a Blackman-Nuttal window function, (k) a Blackman-Harris window function, (l) a flat-top window function, (m) a Turkey window function, (n) a Kaiser window function, or (o) a Dolph-Chebyshev window function. The network entity 1302 may include means for calculating a fused joint spectrum based on the first joint spectrum and the second joint spectrum. The network entity 1302 may include means for measuring a parameter of a target object based on the fused joint spectrum. The parameter of the target object may include a distance of the sensing node from the target object, a speed of the target object, or an angle of the target object relative to the sensing node. The network entity 1302 may include means for transmitting a first joint spectrum report based on the first joint spectrum to a sensing entity. The network entity 1302 may include means for transmitting a second joint spectrum report based on the second joint spectrum to the sensing entity. The first joint spectrum report may include at least one of (a) a first indication of a sensing node identifier (ID) associated with the sensing node, (b) a second indication of a reference signal (RS) ID associated with the set of sensing signals, (c) a third indication of a location associated with the sensing node, or (d) a fourth indication of a spectrum ID associated with the first joint spectrum. The network entity 1302 may include means for receiving an indication of an optimal spectrum ID associated with at least one of the first joint spectrum or the second joint spectrum from the sensing entity. The network entity 1302 may include means for measuring a parameter of a target object based on the optimal spectrum ID in response to receiving the indication of the optimal spectrum ID. The network entity 1302 may include means for receiving an indication of a first weight associated with the first joint spectrum and a second weight associated with the second joint spectrum. The network entity 1302 may include means for calculating a fused joint spectrum based on the first joint spectrum, the first weight, the second joint spectrum, and the second weight in response to receiving the indication of the first weight and the second weight. The network entity 1302 may include means for measuring a parameter of a target object based on the fused joint spectrum. The network entity 1302 may include means for receiving, from the sensing entity, a fused joint spectrum based on the first joint spectrum or the second joint spectrum. The network entity 1302 may include means for measuring a parameter of a target object based on the fused joint spectrum. The network entity 1302 may include means for receiving, from the sensing entity, a sensing report including a parameter of a target object based on the first joint spectrum or the second joint spectrum. The network entity 1302 may include means for calculating an optimized first weight associated with the first joint spectrum and an optimized second weight associated with the second joint spectrum based on the first joint spectrum and the second joint spectrum. The network entity 1302 may include means for calculating a fused joint spectrum based on the first joint spectrum, the optimized first weight, the second joint spectrum, and the optimized second weight. The network entity 1302 may include means for measuring a parameter of a target object based on the fused joint spectrum. The network entity 1302 may include means for calculating the optimized first weight and the optimized second weight by calculating the optimized first weight associated with the first joint spectrum and the optimized second weight associated with the second joint spectrum further based on a previous measured parameter of the target object. The network entity 1302 may include means for receiving the previous measured parameter from a sensing entity. The network entity 1302 may include means for transmitting a request for an estimated target parameter to a sensing entity. The network entity 1302 may include means for receiving an indication of the estimated target parameter from the sensing entity in response to transmitting the request. The network entity 1302 may include means for calculating an optimized first weight associated with the first joint spectrum and an optimized second weight associated with the second joint spectrum based on the indication of the estimated target parameter. The network entity 1302 may include means for calculating a fused joint spectrum based on the first joint spectrum, the optimized first weight, the second joint spectrum, and the optimized second weight. The network entity 1302 may include means for measuring a parameter of a target object based on the fused joint spectrum. The means may be the component 198 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to receive a first joint spectrum report based on a first joint spectrum associated with a target object and a first windowing function from a sensing node. The component 199 may be configured to receive a second joint spectrum report based on a second joint spectrum associated with the target object and a second windowing function from the sensing node. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for receiving a first joint spectrum report based on a first joint spectrum associated with a target object and a first windowing function from a sensing node. The network entity 1302 may include means for receiving a first joint spectrum report based on a first joint spectrum associated with a target object and a first windowing function from a sensing node. The network entity 1302 may include means for receiving a second joint spectrum report based on a second joint spectrum associated with the target object and a second windowing function from the sensing node. The first joint spectrum report may include at least one of (a) a first indication of a sensing node ID associated with the sensing node, (b) a second indication of a reference signal (RS) ID associated with a set of sensing signals, (c) a third indication of a location associated with the sensing node, or (d) a fourth indication of a spectrum ID associated with the first joint spectrum. The network entity 1302 may include means for calculating an optimal joint spectrum based on the first joint spectrum report and the second joint spectrum report. The network entity 1302 may include means for transmitting, to the sensing node, an indication of an optimal spectrum ID associated with at least one of the first joint spectrum or the second joint spectrum based on the optimal joint spectrum. The network entity 1302 may include means for calculating an optimized first weight associated with the first joint spectrum and an optimized second weight associated with the second joint spectrum based on the first joint spectrum report and the second joint spectrum report. The network entity 1302 may include means for transmitting, to the sensing node, a first indication of the optimized first weight and a second indication of the optimized second weight. The network entity 1302 may include means for calculating a fused joint spectrum based on the first joint spectrum and the second joint spectrum. The network entity 1302 may include means for transmitting the fused joint spectrum to the sensing node. The network entity 1302 may include means for calculating a fused joint spectrum based on the first joint spectrum and the second joint spectrum. The network entity 1302 may include means for measuring a parameter of a target object based on the fused joint spectrum. The network entity 1302 may include means for transmitting, to the sensing node, a sensing report including the parameter of the target object. The network entity 1302 may include means for calculating an optimal joint spectrum based on the first joint spectrum report and the second joint spectrum report. The network entity 1302 may include means for measuring a parameter of a target object based on the optimal joint spectrum. The network entity 1302 may include means for transmitting, to the sensing node, a sensing report including the parameter of the target object. The network entity 1302 may include means for calculating an optimized first weight associated with the first joint spectrum and an optimized second weight associated with the second joint spectrum based on the first joint spectrum and the second joint spectrum. The network entity 1302 may include means for calculating a fused joint spectrum based on the first joint spectrum, the optimized first weight, the second joint spectrum, and the optimized second weight. The network entity 1302 may include means for measuring a parameter of a target object based on the fused joint spectrum. The network entity 1302 may include means for transmitting, to the sensing node, a sensing report including the parameter of the target object. The network entity 1302 may include means for receiving a third joint spectrum report based on a third joint spectrum from a third sensing node. The network entity 1302 may include means for calculating a fused joint spectrum based on the first joint spectrum report, the second joint spectrum report, and the third joint spectrum report. The network entity 1302 may include means for measuring a parameter of a target object based on the fused joint spectrum. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
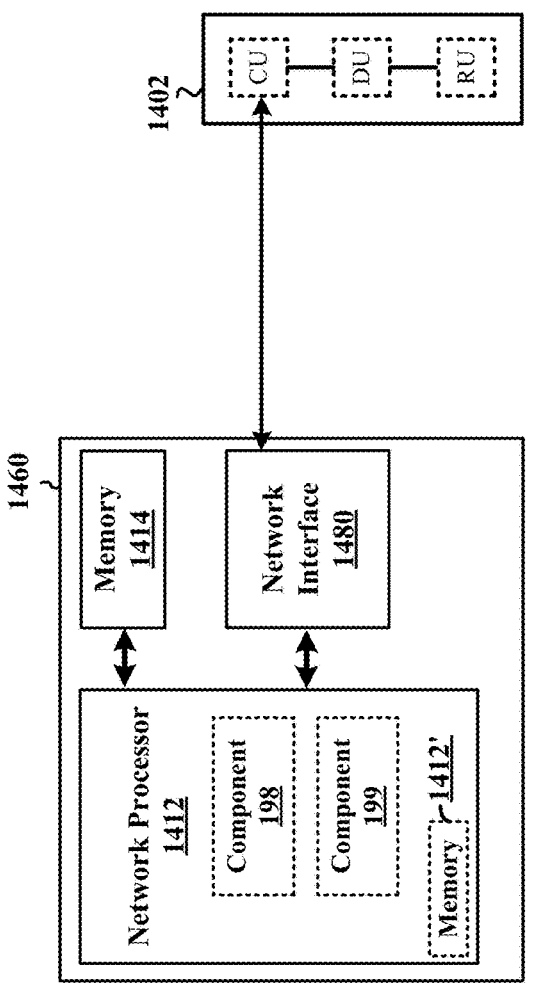
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a set of sensing signals. The component 198 may be configured to calculate a first joint spectrum associated with a target object based on a first windowing function and the set of sensing signals. The component 198 may be configured to calculate a second joint spectrum associated with the target object based on a second windowing function and the set of sensing signals. The component 198 may be within the processor 1412. The component 198 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for receiving a set of sensing signals. The network entity 1460 may include means for calculating a first joint spectrum associated with a target object based on a first windowing function and the set of sensing signals. The network entity 1460 may include means for calculating a second joint spectrum associated with the target object based on a second windowing function and the set of sensing signals. The first windowing function may be different than the second windowing function. The first joint spectrum may include a range spectrum, a Doppler spectrum, and an angle spectrum. The first windowing function may include a first highest side lobe level, a first main lobe width, and a first sidelobe roll-off rate. The second windowing function may include a second highest side lobe level, a second main lobe width, and a second sidelobe roll-off rate. The first highest side lobe level may be different than the second highest side lobe level. The first main lobe width may be different than the second main lobe width. The first sidelobe roll-off rate may be different than the second sidelobe roll-off rate. The network entity 1460 may include means for calculating the first joint spectrum may include calculating a FFT of a radar cube based on the first windowing function and the set of sensing signals. The first windowing function may include at least one of (a) a rectangular window function, (b) a Hamming window function, (c) a raised-cosine window function, (d) a Parzen window function, (e) a Triangular window function, (f) a Welch window function, (g) a Hanning window function, (h) a Blackman window function, (i) a Nuttall window function, (j) a Blackman-Nuttal window function, (k) a Blackman-Harris window function, (l) a flat-top window function, (m) a Turkey window function, (n) a Kaiser window function, or (o) a Dolph-Chebyshev window function. The network entity 1460 may include means for calculating a fused joint spectrum based on the first joint spectrum and the second joint spectrum. The network entity 1460 may include means for measuring a parameter of a target object based on the fused joint spectrum. The parameter of the target object may include a distance of the sensing node from the target object, a speed of the target object, or an angle of the target object relative to the sensing node. The network entity 1460 may include means for transmitting a first joint spectrum report based on the first joint spectrum to a sensing entity. The network entity 1460 may include means for transmitting a second joint spectrum report based on the second joint spectrum to the sensing entity. The first joint spectrum report may include at least one of (a) a first indication of a sensing node identifier (ID) associated with the sensing node, (b) a second indication of a reference signal (RS) ID associated with the set of sensing signals, (c) a third indication of a location associated with the sensing node, or (d) a fourth indication of a spectrum ID associated with the first joint spectrum. The network entity 1460 may include means for receiving an indication of an optimal spectrum ID associated with at least one of the first joint spectrum or the second joint spectrum from the sensing entity. The network entity 1460 may include means for measuring a parameter of a target object based on the optimal spectrum ID in response to receiving the indication of the optimal spectrum ID. The network entity 1460 may include means for receiving an indication of a first weight associated with the first joint spectrum and a second weight associated with the second joint spectrum. The network entity 1460 may include means for calculating a fused joint spectrum based on the first joint spectrum, the first weight, the second joint spectrum, and the second weight in response to receiving the indication of the first weight and the second weight. The network entity 1460 may include means for measuring a parameter of a target object based on the fused joint spectrum. The network entity 1460 may include means for receiving, from the sensing entity, a fused joint spectrum based on the first joint spectrum or the second joint spectrum. The network entity 1460 may include means for measuring a parameter of a target object based on the fused joint spectrum. The network entity 1460 may include means for receiving, from the sensing entity, a sensing report including a parameter of a target object based on the first joint spectrum or the second joint spectrum. The network entity 1460 may include means for calculating an optimized first weight associated with the first joint spectrum and an optimized second weight associated with the second joint spectrum based on the first joint spectrum and the second joint spectrum. The network entity 1460 may include means for calculating a fused joint spectrum based on the first joint spectrum, the optimized first weight, the second joint spectrum, and the optimized second weight. The network entity 1460 may include means for measuring a parameter of a target object based on the fused joint spectrum. The network entity 1460 may include means for calculating the optimized first weight and the optimized second weight by calculating the optimized first weight associated with the first joint spectrum and the optimized second weight associated with the second joint spectrum further based on a previous measured parameter of the target object. The network entity 1460 may include means for receiving the previous measured parameter from a sensing entity. The network entity 1460 may include means for transmitting a request for an estimated target parameter to a sensing entity. The network entity 1460 may include means for receiving an indication of the estimated target parameter from the sensing entity in response to transmitting the request. The network entity 1460 may include means for calculating an optimized first weight associated with the first joint spectrum and an optimized second weight associated with the second joint spectrum based on the indication of the estimated target parameter. The network entity 1460 may include means for calculating a fused joint spectrum based on the first joint spectrum, the optimized first weight, the second joint spectrum, and the optimized second weight. The network entity 1460 may include means for measuring a parameter of a target object based on the fused joint spectrum. The means may be the component 198 of the network entity 1460 configured to perform the functions recited by the means.

As discussed supra, the component 199 may be configured to receive a first joint spectrum report based on a first joint spectrum associated with a target object and a first windowing function from a sensing node. The component 199 may be configured to receive a second joint spectrum report based on a second joint spectrum associated with the target object and a second windowing function from the sensing node. The component 199 may be within the processor 1412. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for receiving a first joint spectrum report based on a first joint spectrum associated with a target object and a first windowing function from a sensing node. The network entity 1460 may include means for receiving a first joint spectrum report based on a first joint spectrum associated with a target object and a first windowing function from a sensing node. The network entity 1460 may include means for receiving a second joint spectrum report based on a second joint spectrum associated with the target object and a second windowing function from the sensing node. The first joint spectrum report may include at least one of (a) a first indication of a sensing node ID associated with the sensing node, (b) a second indication of a reference signal (RS) ID associated with a set of sensing signals, (c) a third indication of a location associated with the sensing node, or (d) a fourth indication of a spectrum ID associated with the first joint spectrum. The network entity 1460 may include means for calculating an optimal joint spectrum based on the first joint spectrum report and the second joint spectrum report. The network entity 1460 may include means for transmitting, to the sensing node, an indication of an optimal spectrum ID associated with at least one of the first joint spectrum or the second joint spectrum based on the optimal joint spectrum. The network entity 1460 may include means for calculating an optimized first weight associated with the first joint spectrum and an optimized second weight associated with the second joint spectrum based on the first joint spectrum report and the second joint spectrum report. The network entity 1460 may include means for transmitting, to the sensing node, a first indication of the optimized first weight and a second indication of the optimized second weight. The network entity 1460 may include means for calculating a fused joint spectrum based on the first joint spectrum and the second joint spectrum. The network entity 1460 may include means for transmitting the fused joint spectrum to the sensing node. The network entity 1460 may include means for calculating a fused joint spectrum based on the first joint spectrum and the second joint spectrum. The network entity 1460 may include means for measuring a parameter of a target object based on the fused joint spectrum. The network entity 1460 may include means for transmitting, to the sensing node, a sensing report including the parameter of the target object. The network entity 1460 may include means for calculating an optimal joint spectrum based on the first joint spectrum report and the second joint spectrum report. The network entity 1460 may include means for measuring a parameter of a target object based on the optimal joint spectrum. The network entity 1460 may include means for transmitting, to the sensing node, a sensing report including the parameter of the target object. The network entity 1460 may include means for calculating an optimized first weight associated with the first joint spectrum and an optimized second weight associated with the second joint spectrum based on the first joint spectrum and the second joint spectrum. The network entity 1460 may include means for calculating a fused joint spectrum based on the first joint spectrum, the optimized first weight, the second joint spectrum, and the optimized second weight. The network entity 1460 may include means for measuring a parameter of a target object based on the fused joint spectrum. The network entity 1460 may include means for transmitting, to the sensing node, a sensing report including the parameter of the target object. The network entity 1460 may include means for receiving a third joint spectrum report based on a third joint spectrum from a third sensing node. The network entity 1460 may include means for calculating a fused joint spectrum based on the first joint spectrum report, the second joint spectrum report, and the third joint spectrum report. The network entity 1460 may include means for measuring a parameter of a target object based on the fused joint spectrum. The means may be the component 199 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a sensing node, where the method may include receiving a set of sensing signals. The method may include calculating a first joint spectrum associated with a target object based on a first windowing function and the set of sensing signals. The method may include calculating a second joint spectrum associated with the target object based on a second windowing function and the set of sensing signals. The first windowing function may be different than the second windowing function.

Aspect 2 is the method of aspect 1, where the first joint spectrum may include a range spectrum, a Doppler spectrum, and an angle spectrum.

Aspect 3 is the method of either of aspects 1 or 2, where the first windowing function may include a first highest side lobe level, a first main lobe width, and a first sidelobe roll-off rate. The second windowing function may include a second highest side lobe level, a second main lobe width, and a second sidelobe roll-off rate. The first highest side lobe level may be different than the second highest side lobe level. The first main lobe width may be different than the second main lobe width. The first sidelobe roll-off rate may be different than the second sidelobe roll-off rate.

Aspect 4 is the method of any of aspects 1 to 3, where calculating the first joint spectrum may include calculating a FFT of a radar cube based on the first windowing function and the set of sensing signals.

Aspect 5 is the method of any of aspects 1 to 4, where the first windowing function may include at least one of (a) a rectangular window function, (b) a Hamming window function, (c) a raised-cosine window function, (d) a Parzen window function, (e) a Triangular window function, (f) a Welch window function, (g) a Hanning window function, (h) a Blackman window function, (i) a Nuttall window function, (j) a Blackman-Nuttal window function, (k) a Blackman-Harris window function, (l) a flat-top window function, (m) a Turkey window function, (n) a Kaiser window function, or (o) a Dolph-Chebyshev window function.

Aspect 6 is the method of any of aspects 1 to 5, where the method may include calculating a fused joint spectrum based on the first joint spectrum and the second joint spectrum. The method may include estimating, measuring, and/or calculating a parameter of a target object based on the fused joint spectrum.

Aspect 7 is the method of any aspect 6, where the parameter of the target object may include a distance of the sensing node from the target object, a speed of the target object, or an angle of the target object relative to the sensing node.

Aspect 8 is the method of any of aspects 1 to 7, where the method may include transmitting a first joint spectrum report based on the first joint spectrum to a sensing entity. The method may include transmitting a second joint spectrum report based on the second joint spectrum to the sensing entity.

Aspect 9 is the method of aspect 8, where the first joint spectrum report may include at least one of (a) a first indication of a sensing node ID associated with the sensing node, (b) a second indication of an RS ID associated with the set of sensing signals, (c) a third indication of a location associated with the sensing node, or (d) a fourth indication of a spectrum ID associated with the first joint spectrum.

Aspect 10 is the method of either of aspects 8 or 9, where the method may include receiving an indication of an optimal spectrum ID associated with at least one of the first joint spectrum or the second joint spectrum from the sensing entity. The method may include estimating, measuring, and/or calculating a parameter of a target object based on the optimal spectrum ID in response to receiving the indication of the optimal spectrum ID.

Aspect 11 is the method of any of aspects 8 to 10, where the method may include receiving an indication of a first weight associated with the first joint spectrum and a second weight associated with the second joint spectrum. The method may include calculating a fused joint spectrum based on the first joint spectrum, the first weight, the second joint spectrum, and the second weight in response to receiving the indication of the first weight and the second weight. The method may include estimating, measuring, and/or calculating a parameter of a target object based on the fused joint spectrum.

Aspect 12 is the method of any of aspects 8 to 11, where the method may include receiving, from the sensing entity, a fused joint spectrum based on the first joint spectrum or the second joint spectrum. The method may include estimating, measuring, and/or calculating a parameter of a target object based on the fused joint spectrum.

Aspect 13 is the method of any of aspects 8 to 12, where the method may include receiving, from the sensing entity, a sensing report including a parameter of a target object based on the first joint spectrum or the second joint spectrum.

Aspect 14 is the method of any of aspects 1 to 13, where the method may include calculating an optimized first weight associated with the first joint spectrum and an optimized second weight associated with the second joint spectrum based on the first joint spectrum and the second joint spectrum. The method may include calculating a fused joint spectrum based on the first joint spectrum, the optimized first weight, the second joint spectrum, and the optimized second weight. The method may include estimating, measuring, and/or calculating a parameter of a target object based on the fused joint spectrum.

Aspect 15 is the method of any of aspects 1 to 14, where calculating the optimized first weight and the optimized second weight may include calculating the optimized first weight associated with the first joint spectrum and the optimized second weight associated with the second joint spectrum further based on a previous estimated, measured, and/or calculated parameter of the target object.

Aspect 16 is the method of any of aspects 1 to 15, where the method may include receiving the previous estimated, measured, and/or calculated parameter from a sensing entity.

Aspect 17 is the method of any of aspects 1 to 16, where the method may include transmitting a request for an estimated target parameter to a sensing entity. The method may include receiving an indication of the estimated target parameter from the sensing entity in response to transmitting the request. The method may include calculating an optimized first weight associated with the first joint spectrum and an optimized second weight associated with the second joint spectrum based on the indication of the estimated target parameter. The method may include calculating a fused joint spectrum based on the first joint spectrum, the optimized first weight, the second joint spectrum, and the optimized second weight. The method may include estimating, measuring, and/or calculating a parameter of a target object based on the fused joint spectrum.

Aspect 18 a method of wireless communication at a sensing entity, where the method may include receiving a first joint spectrum report based on a first joint spectrum associated with a target object and a first windowing function from a sensing node. The method may include receiving a second joint spectrum report based on a second joint spectrum associated with the target object and a second windowing function from the sensing node.

Aspect 19 is the method of aspect 18, where the first joint spectrum report may include at least one of (a) a first indication of a sensing node ID associated with the sensing node, (b) a second indication of a reference signal (RS) ID associated with a set of sensing signals, (c) a third indication of a location associated with the sensing node, or (d) a fourth indication of a spectrum ID associated with the first joint spectrum.

Aspect 20 is the method of either of aspects 18 or 19, where the method may include calculating an optimal joint spectrum based on the first joint spectrum report and the second joint spectrum report. The method may include transmitting, to the sensing node, an indication of an optimal spectrum ID associated with at least one of the first joint spectrum or the second joint spectrum based on the optimal joint spectrum.

Aspect 21 is the method of any of aspects 18 to 20, where the method may include calculating an optimized first weight associated with the first joint spectrum and an optimized second weight associated with the second joint spectrum based on the first joint spectrum report and the second joint spectrum report. The method may include transmitting, to the sensing node, a first indication of the optimized first weight and a second indication of the optimized second weight.

Aspect 22 is the method of any of aspects 18 to 21, where the method may include calculating a fused joint spectrum based on the first joint spectrum and the second joint spectrum.

Aspect 23 is the method of aspect 22, where the method may include transmitting the fused joint spectrum to the sensing node.

Aspect 24 is the method of any of aspects 18 to 23, where the method may include calculating a fused joint spectrum based on the first joint spectrum and the second joint spectrum. The method may include estimating, measuring, and/or calculating a parameter of a target object based on the fused joint spectrum.

Aspect 25 is the method of aspect 24, where the method may include transmitting, to the sensing node, a sensing report including the parameter of the target object.

Aspect 26 is the method of any of aspects 18 to 25, where the method may include calculating an optimal joint spectrum based on the first joint spectrum report and the second joint spectrum report. The method may include estimating, measuring, and/or calculating a parameter of a target object based on the optimal joint spectrum.

Aspect 27 is the method of aspect 26, where the method may include transmitting, to the sensing node, a sensing report including the parameter of the target object.

Aspect 28 is the method of any of aspects 18 to 27, where the method may include calculating an optimized first weight associated with the first joint spectrum and an optimized second weight associated with the second joint spectrum based on the first joint spectrum and the second joint spectrum. The method may include calculating a fused joint spectrum based on the first joint spectrum, the optimized first weight, the second joint spectrum, and the optimized second weight. The method may include estimating, measuring, and/or calculating a parameter of a target object based on the fused joint spectrum.

Aspect 29 is the method of any of aspect 28, where the method may include transmitting, to the sensing node, a sensing report including the parameter of the target object.

Aspect 30 is the method of any of aspects 18 to 29, where the method may include receiving a third joint spectrum report based on a third joint spectrum from a third sensing node. The method may include calculating a fused joint spectrum based on the first joint spectrum report, the second joint spectrum report, and the third joint spectrum report. The method may include estimating, measuring, and/or calculating a parameter of a target object based on the fused joint spectrum.

Aspect 31 is an apparatus for wireless communication, including: a memory; and at least one processor coupled to the memory and, based at least in part on information stored in the memory, the at least one processor is configured to implement any of aspects 1 to 30.

Aspect 32 is the apparatus of aspect 31, further including at least one of an antenna or a transceiver coupled to the at least one processor.

Aspect 33 is an apparatus for wireless communication including means for implementing any of aspects 1 to 30.

Aspect 34 is a computer-readable medium (e.g., a non-transitory computer-readable medium) storing computer executable code, where the code when executed by a processor causes the processor to implement any of aspects 1 to 30.

What is claimed is:

1. An apparatus for wireless communication at a sensing node, comprising:
a memory; and
at least one processor coupled to the memory and, based at least in part on information stored in the memory, the at least one processor is configured to:
receive a set of sensing signals;
calculate a first joint spectrum associated with a target object based on a first windowing function and the set of sensing signals; and
calculate a second joint spectrum associated with the target object based on a second windowing function and the set of sensing signals, wherein the first windowing function is different than the second windowing function,
wherein the at least one processor is further configured to:
transmit a first joint spectrum report based on the first joint spectrum to a sensing entity; and
transmit a second joint spectrum report based on the second joint spectrum to the sensing entity, wherein the first joint spectrum report comprises at least one of:

a first indication of a sensing node identifier (ID) associated with the sensing node;

a second indication of a reference signal (RS) ID associated with the set of sensing signals;

a third indication of a location associated with the sensing node; or a fourth indication of a spectrum ID associated with the first joint spectrum.

2. The apparatus of claim 1, wherein the first joint spectrum comprises a range spectrum, a Doppler spectrum, and an angle spectrum.

3. The apparatus of claim 1, wherein the first windowing function comprises a first highest side lobe level, a first main lobe width, and a first sidelobe roll-off rate, wherein the second windowing function comprises a second highest side lobe level, a second main lobe width, and a second sidelobe roll-off rate, wherein the first highest side lobe level is different than the second highest side lobe level, wherein the first main lobe width is different than the second main lobe width, wherein the first sidelobe roll-off rate is different than the second sidelobe roll-off rate.

4. The apparatus of claim 1, wherein the first windowing function comprises at least one of:

a rectangular window function;

a Hamming window function;

a raised-cosine window function;

a Parzen window function;

a Triangular window function;

a Welch window function;

a Hanning window function;

a Blackman window function;

a Nuttall window function;

a Blackman-Nuttal window function;

a Blackman-Harris window function;

a flat-top window function;

a Turkey window function;

a Kaiser window function; or a Dolph-Chebyshev window function.

5. The apparatus of claim 1, wherein the at least one processor is further configured to:

calculate a fused joint spectrum based on the first joint spectrum and the second joint spectrum; and calculate a parameter of the target object based on the fused joint spectrum.

6. The apparatus of claim 5, wherein the parameter of the target object comprises a distance of the sensing node from the target object, a speed of the target object, or an angle of the target object relative to the sensing node.

7. The apparatus of claim 1, wherein the at least one processor is further configured to:

receive an indication of an optimal spectrum identifier (ID) associated with at least one of the first joint spectrum or the second joint spectrum from the sensing entity; and calculate a parameter of the target object based on the optimal spectrum ID in response to the reception of the indication of the optimal spectrum ID.

8. The apparatus of claim 1, wherein the at least one processor is further configured to:

receive an indication of a first weight associated with the first joint spectrum and a second weight associated with the second joint spectrum;

calculate a fused joint spectrum based on the first joint spectrum, the first weight, the second joint spectrum, and the second weight in response to the reception of the indication of the first weight and the second weight; and estimate a parameter of the target object based on the fused joint spectrum.

9. The apparatus of claim 1, wherein the at least one processor is further configured to:

receive, from the sensing entity, a fused joint spectrum based on the first joint spectrum or the second joint spectrum; and estimate a parameter of the target object based on the fused joint spectrum.

10. The apparatus of claim 1, wherein the at least one processor is further configured to:

receive, from the sensing entity, a sensing report comprising a parameter of the target object based on the first joint spectrum or the second joint spectrum.

11. The apparatus of claim 1, wherein the at least one processor is further configured to:

calculate an optimized first weight associated with the first joint spectrum and an optimized second weight associated with the second joint spectrum based on the first joint spectrum and the second joint spectrum;

calculate a fused joint spectrum based on the first joint spectrum, the optimized first weight, the second joint spectrum, and the optimized second weight; and estimate a parameter of the target object based on the fused joint spectrum.

12. The apparatus of claim 11, wherein, to calculate the optimized first weight and the optimized second weight, the at least one processor is configured to:

calculate the optimized first weight associated with the first joint spectrum and the optimized second weight associated with the second joint spectrum further based on a previous estimated parameter of the target object.

13. The apparatus of claim 12, further comprising a transceiver coupled to the at least one processor, wherein the at least one processor is further configured to:

receive, via the transceiver, the previous estimated parameter from a sensing entity.

14. The apparatus of claim 1, wherein the at least one processor is further configured to:

transmit a request for an estimated target parameter to a sensing entity;

receive an indication of the estimated target parameter from the sensing entity in response to the transmission of the request;

calculate an optimized first weight associated with the first joint spectrum and an optimized second weight associated with the second joint spectrum based on the indication of the estimated target parameter;

calculate a fused joint spectrum based on the first joint spectrum, the optimized first weight, the second joint spectrum, and the optimized second weight; and estimate a parameter of the target object based on the fused joint spectrum.

15. An apparatus for wireless communication at a sensing entity, comprising:

a memory; and at least one processor coupled to the memory and, based at least in part on information stored in the memory, the at least one processor is configured to:

receive a first joint spectrum report based on a first joint spectrum associated with a target object and a first windowing function from a sensing node; and receive a second joint spectrum report based on a second joint spectrum associated with the target object and a second windowing function from the sensing node, wherein the first joint spectrum report comprises at least one of:

a first indication of a sensing node identifier (ID) associated with the sensing node;

a second indication of a reference signal (RS) ID associated with a set of sensing signals;

a third indication of a location associated with the sensing node; or a fourth indication of a spectrum ID associated with the first joint spectrum.

16. The apparatus of claim 15, further comprising a transceiver coupled to the at least one processor, wherein the at least one processor is further configured to:

calculate an optimal joint spectrum based on the first joint spectrum report and the second joint spectrum report; and transmit, to the sensing node via the transceiver, an indication of an optimal spectrum identifier (ID) associated with at least one of the first joint spectrum or the second joint spectrum based on the optimal joint spectrum.

17. The apparatus of claim 15, wherein the at least one processor is further configured to:

calculate an optimized first weight associated with the first joint spectrum and an optimized second weight associated with the second joint spectrum based on the first joint spectrum report and the second joint spectrum report; and transmit, to the sensing node, a first indication of the optimized first weight and a second indication of the optimized second weight.

18. The apparatus of claim 15, wherein the at least one processor is further configured to:

calculate a fused joint spectrum based on the first joint spectrum and the second joint spectrum; and transmit the fused joint spectrum to the sensing node.

19. The apparatus of claim 15, wherein the at least one processor is further configured to:

calculate a fused joint spectrum based on the first joint spectrum and the second joint spectrum; and estimate a parameter of the target object based on the fused joint spectrum.

20. The apparatus of claim 19, wherein the at least one processor is further configured to:

transmit, to the sensing node, a sensing report comprising the parameter of the target object.

21. The apparatus of claim 15, wherein the at least one processor is further configured to:

calculate an optimal joint spectrum based on the first joint spectrum report and the second joint spectrum report; and estimate a parameter of the target object based on the optimal joint spectrum.

22. The apparatus of claim 21, wherein the at least one processor is further configured to:

transmit, to the sensing node, a sensing report comprising the parameter of the target object.

23. The apparatus of claim 15, wherein the at least one processor is further configured to:

calculate an optimized first weight associated with the first joint spectrum and an optimized second weight associated with the second joint spectrum based on the first joint spectrum and the second joint spectrum;

calculate a fused joint spectrum based on the first joint spectrum, the optimized first weight, the second joint spectrum, and the optimized second weight; and estimate a parameter of the target object based on the fused joint spectrum.

24. The apparatus of claim 23, wherein the at least one processor is further configured to:

transmit, to the sensing node, a sensing report comprising the parameter of the target object.

25. The apparatus of claim 15, wherein the at least one processor is further configured to:

receive a third joint spectrum report based on a third joint spectrum from a third sensing node;

calculate a fused joint spectrum based on the first joint spectrum report, the second joint spectrum report, and the third joint spectrum report; and estimate a parameter of the target object based on the fused joint spectrum.

26. A method of wireless communication at a sensing node, comprising:

receiving a set of sensing signals;

calculating a first joint spectrum based on a first windowing function and the set of sensing signals; and calculating a second joint spectrum based on a second windowing function and the set of sensing signals, wherein the first windowing function is different than the second windowing function, wherein the first joint spectrum report comprises at least one of:

a first indication of a sensing node identifier (ID) associated with the sensing node;

a second indication of a reference signal (RS) ID associated with a set of sensing signals;

a third indication of a location associated with the sensing node; or a fourth indication of a spectrum ID associated with the first joint spectrum.

27. A method of wireless communication at a sensing entity, comprising:

receiving a first joint spectrum report based on a first joint spectrum from a sensing node; and receiving a second joint spectrum report based on a second joint spectrum from the sensing node, wherein the first joint spectrum report comprises at least one of:

a first indication of a sensing node identifier (ID) associated with the sensing node;

a second indication of a reference signal (RS) ID associated with a set of sensing signals;

a third indication of a location associated with the sensing node; or a fourth indication of a spectrum ID associated with the first joint spectrum.

* * * * *